United States Patent
Onda

(10) Patent No.: US 10,525,337 B2
(45) Date of Patent: Jan. 7, 2020

(54) TERMINAL DEVICE

(71) Applicant: BANDAI NAMCO Entertainment Inc., Tokyo (JP)

(72) Inventor: Ko Onda, Tokyo (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 219 days.

(21) Appl. No.: 15/082,481

(22) Filed: Mar. 28, 2016

(65) Prior Publication Data
US 2016/0317915 A1    Nov. 3, 2016

(30) Foreign Application Priority Data

Apr. 28, 2015    (JP) ................................. 2015-092324

(51) Int. Cl.
| | | |
|---|---|---|
| *A63F 13/2145* | (2014.01) | |
| *G06F 3/041* | (2006.01) | |
| *G06F 3/0488* | (2013.01) | |
| *G06F 3/0484* | (2013.01) | |

(52) U.S. Cl.
CPC ........ *A63F 13/2145* (2014.09); *G06F 3/0412* (2013.01); *G06F 3/0488* (2013.01); *G06F 3/04847* (2013.01)

(58) Field of Classification Search
CPC .... A63F 13/2145; A63F 13/833; A63F 13/92; G06F 3/04847; G06F 3/0412; G06F 3/0488
See application file for complete search history.

(56) References Cited

U.S. PATENT DOCUMENTS

| | | | | |
|---|---|---|---|---|
| 5,231,381 A | * | 7/1993 | Duwaer ................. | G06F 3/016 178/18.03 |
| 2006/0128468 A1 | * | 6/2006 | Yoshikawa ............. | A63F 13/10 463/36 |
| 2013/0194209 A1 | * | 8/2013 | Tsukagoshi ............ | G06F 3/041 345/173 |
| 2014/0282084 A1 | * | 9/2014 | Murarka ................. | H04L 51/32 715/752 |
| 2018/0101290 A1 | * | 4/2018 | Ding ..................... | G06F 3/0488 |

FOREIGN PATENT DOCUMENTS

| | | |
|---|---|---|
| JP | 2007-130367 A | 5/2007 |
| JP | 2007-260012 A | 10/2007 |
| JP | 2009-153681 A | 7/2009 |
| JP | 2010-017395 A | 1/2010 |

* cited by examiner

*Primary Examiner* — William H McCulloch, Jr.
*Assistant Examiner* — Yingchuan Zhang
(74) *Attorney, Agent, or Firm* — Oliff PLC

(57) ABSTRACT

A terminal device receives an input instruction on a game process that corresponds to an input reception area when a touch operation input on the input reception area has been detected by a first detection process, and disables a given input instruction that corresponds to the input reception area when a slide operation input on the input reception area has been detected by a second detection process, the slide operation input having been performed to directly follow the touch operation input performed when the input instruction regarding the game process was received.

14 Claims, 8 Drawing Sheets

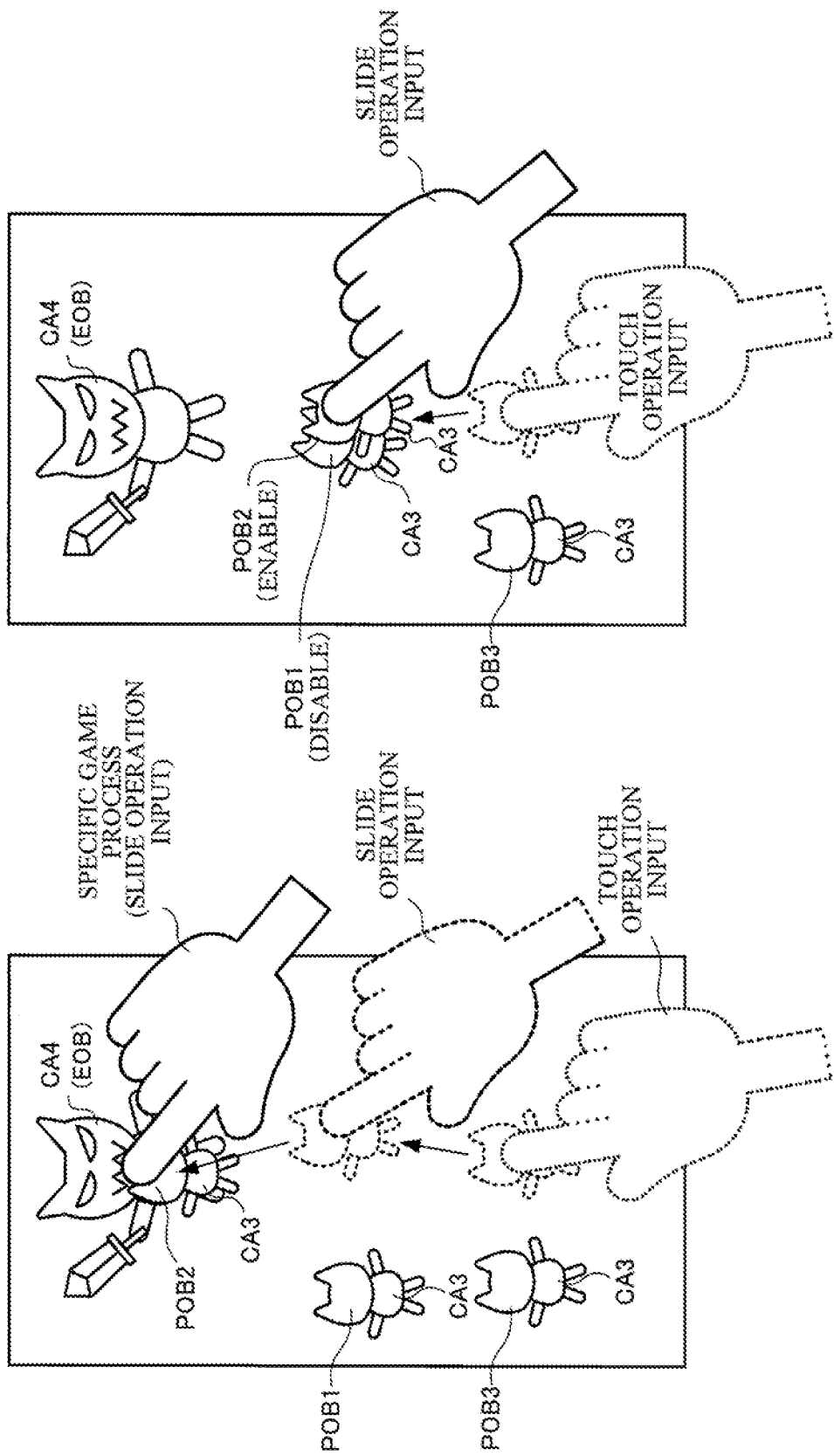

TERMINAL DEVICE

Japanese Patent Application No. 2015-092324 filed on Apr. 28, 2015, is hereby incorporated by reference in its entirety.

BACKGROUND OF THE INVENTION

The present invention relates to a terminal device.

In recent years, an information communication terminal device such as a tablet-type information communication terminal device or a smartphone (hereinafter referred to as "portable communication terminal device") has been provided with various functions, enhanced in functions, and used widely, and has been increasingly used to play a game. Various portable terminal devices that can implement a game have been provided in addition to the portable communication terminal device.

Such a terminal device may be designed so that the user operates the terminal device using a controller (e.g., keyboard or numeric keypad), or may include a touch panel provided to a display screen, and may be designed so that the user operates the terminal device by touching the game display screen either indirectly (i.e., using a pointing device) or directly (hereinafter referred to as "touch operation").

In recent years, various devices other than a terminal device such as a personal computer are provided with a user interface that allows the user to perform a touch operation on the display screen. Such a user interface has been used for a device that implements a game so as to complement or replace a known interface (e.g., keyboard or numeric keypad).

Such a terminal device may be designed to perform a process that moves an object based on (in response to) a touch operation. For example, a terminal device that is designed to perform a process that moves an object based on the moving amount of a touch position detected within a touch detection area (touch panel) provided on a display screen is known (see JP-A-2009-153681, for example).

The game device disclosed in JP-A-2009-153681 allows the user to input a touch operation (hereinafter referred to as "touch operation input"), and input a slide operation (hereinafter referred to as "slide operation input") that directly follows the touch operation input to proceed with the game. However, the game device disclosed in JP-A-2009-153681 has a problem in that it is difficult for the user to perform a fine touch operation input and slide operation input, and an unintentional touch operation input or slide operation input performed by the user may be detected as the operation input.

SUMMARY

Several aspects of the invention may provide a terminal device that can perform a predetermined process based on an intentional operation performed by the user (e.g., player), and improve operability even when a touch panel for which it is difficult to perform a fine operation is used.

According to a first aspect of the invention, there is provided a terminal device that receives a slide operation input that has been performed on a touch panel on which a given screen is displayed, and implements a game corresponding to the received slide operation input, the terminal device including:

a touch operation detector that performs a first detection process that detects a touch operation input that has been performed in a state in which no touch operation input is performed on the screen, and a second detection process that detects a slide operation input that has been performed to directly follow the touch operation input detected by the first detection process;

a display controller that displays a first input reception area and a second input reception area that differs from the first input reception area within the screen, the first and second input reception areas being used to receive the touch operation input or the slide operation input performed by a player in connection with the game;

an input controller that receives an input instruction based on the touch operation input or the slide operation input performed by the player on the first and second input reception areas, the slide operation input having been performed to directly follow the touch operation input; and a game controller that performs a game process based on the input instruction received by the input controller;

wherein the input controller receives the input instruction regarding the game process that corresponds to the first input reception area when the touch operation input on the first input reception area has been detected by the first detection process; and wherein the input controller disables a given input instruction that corresponds to the second input reception area when the slide operation input on the second input reception area has been detected by the second detection process, the slide operation input having been performed to directly follow the touch operation input performed when the input instruction regarding the game process was received (i.e., when the slide operation input on the second input reception area has been detected during the slide operation input performed to directly follow the touch operation input performed when the input instruction regarding the game process was received).

According to a second aspect of the invention, there is provided a terminal device that receives a slide operation input that has been performed on a touch panel on which a given screen is displayed, the terminal device including:

a touch operation detector that performs a first detection process that detects a touch operation input that has been performed in a state in which no touch operation input is performed on the screen, and a second detection process that detects a slide operation input that has been performed to directly follow the touch operation input detected by the first detection process;

a display controller that displays a first input reception area and a second input reception area that differs from the first input reception area within the screen, the first and second input reception areas being used to receive the touch operation input or the slide operation input performed by a user;

an input controller that receives an input instruction based on the touch operation input or the slide operation input performed by a user on the first and second input reception areas, the slide operation input having been performed to directly follow the touch operation input; and a game controller that performs a given process based on the input instruction received by the input controller;

wherein the input controller receives the input instruction that corresponds to the first input reception area when the touch operation input on the first input reception area has been detected by the first detection process; and wherein the input controller disables a given input instruction that corresponds to the second input reception area when the slide operation input on the second input reception area has been detected by the second detection process, the slide operation input having been performed to directly follow the touch operation input performed when the input instruction was received (i.e., when the slide operation input that is performed to directly follow the touch operation input performed when the input instruction regarding the game process was received during the slide operation input performed to directly follow the touch operation input performed when the input instruction was received).

BRIEF DESCRIPTION OF THE SEVERAL VIEWS OF THE DRAWING

FIGS. 6A and 6B illustrate a player character selection control process based on a slide operation input according to one embodiment of the invention.

Figure 1:
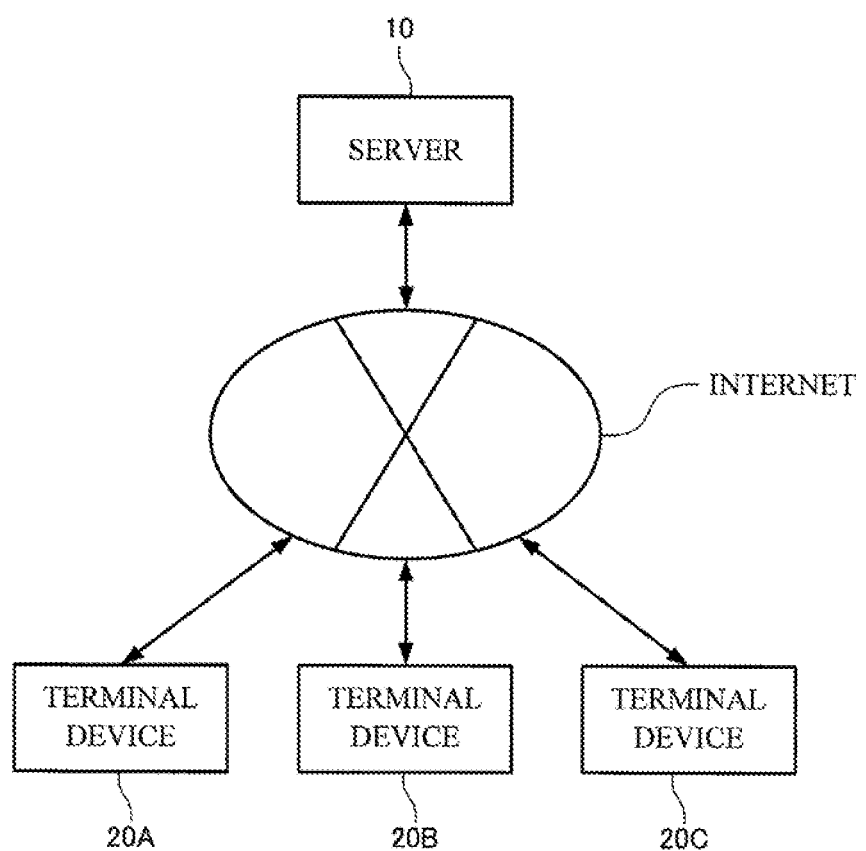
FIG. 1 illustrates an example of the configuration of a game system according to one embodiment of the invention.

DETAILED DESCRIPTION OF THE EMBODIMENT (1) According to one embodiment of the invention, a terminal device receives a slide operation input that has been performed on a touch panel on which a given screen is displayed, and implements a game corresponding to the received slide operation input, the terminal device including:

a touch operation detector that performs a first detection process that detects a touch operation input that has been performed in a state in which no touch operation input is performed on the screen, and a second detection process that detects a slide operation input that has been performed to directly follow the touch operation input detected by the first detection process;

a display controller that displays an input reception area within the screen, the input reception area being used to receive an operation input performed by a player in connection with the game;

input controller that receives an input instruction based on the operation input performed by the player on the input reception area; and game controller that performs a game process based on the input instruction received by the input controller, and the slide operation input that has been performed to directly follow the touch operation input when the input instruction was received, wherein the input controller receives the input instruction regarding the game process that corresponds to a first input reception area when the touch operation input on the first input reception area has been detected by the first detection process, and disables a given input instruction that corresponds to a second input reception area that differs from the first input reception area when the slide operation input that is performed to directly follow the touch operation input performed when the input instruction regarding the game process was received is being detected by the second detection process, and the slide operation input on the second input reception area has been detected.

The terminal device can disable (does not receive) the input instruction that corresponds to the second input reception area, and continue the game process based on the input instruction that corresponds to the first input reception area, the touch operation input, and the slide operation input when the slide operation input has been performed on the second input reception area in a state in which the slide operation input is being performed to directly follow the touch operation input performed when the input instruction regarding the game process was received.

It is normally difficult to finely perform a touch operation input or a slide operation input on a touch panel as compared with the case of using an arrow key or a joystick. In particular, a situation in which the player character that is being operated intersects another operation target player character, or a situation in which a slide operation input that selects a specific command passes through a display area of another command, may occur depending on the size of the screen, or the display state of the game screen displayed on the screen, for example.

Therefore, the terminal device determines that the player is performing the slide operation input based on the player character that is being operated or the specific command that has been selected when the slide operation input is being performed to directly follow the touch operation input performed when the input instruction regarding the game process was received, and disables the input instruction that corresponds to the second input reception area.

Since the terminal device can proceed with the game based on an intentional operation performed by the player without performing a control process based on an unintentional operation performed by the player even when a touch panel for which it is difficult to perform a fine operation is used, it is possible to improve the playability of a game that utilizes a touch panel, and provide an attractive game.

Note that the terms "touch operation input" and "slide operation input" used herein include (a) a direct touch operation or slide operation on the touch panel that is performed with a finger of the user, (b) an indirect touch operation input or slide operation input on the touch panel that is performed using a device such as a pointing device, and (c) a touch operation or a slide operation that is determined by detecting a pseudo-operation (pseudo-touch operation or pseudo-slide operation) that is performed on the touch panel.

For example, the term "pseudo-touch operation" or "pseudo-slide operation" used herein includes a touch operation or a slide operation that is detected when the user has touched or approximately touched the touch panel, such as (c1) a touch operation or a slide operation that is determined based on coordinates when a light beam (e.g., infrared rays) is applied at a position close to the surface of the touch panel parallel to the surface of the touch panel, and the coordinates in the vertical direction and the horizontal direction at which the light beam is blocked when the user has touched or approximately touched the touch panel are detected using a plurality of irradiation sections (that are formed on one side of the touch panel in the vertical direction and the horizontal direction at a given interval) and a plurality of sensors (that make a pair with each irradiation section, are provided on the other side of the touch panel opposite to each irradiation section, and receive the applied light beam), and (c2) a touch operation or a slide operation that is determined based on position coordinates when a camera that captures the display screen of the touch panel is provided, and the position coordinates at which the user has touched or approximately touched the touch panel are detected using the camera.

The term "input reception area" used herein refers to an area for detecting an input instruction that is linked to a predetermined area within the screen when the player has performed a touch operation input or a slide operation input on the given area.

The input reception area may be displayed in a predetermined area within the screen in a stationary state, or may be displayed so as to be movable within the screen. For example, the input reception area is an area for inputting a specific command that performs a specific control process on a player character that is operated by the player, or an area for selecting the player character that is displayed within the game space in a stationary state or a moving state.

When the expression "disables a given input instruction regarding the game process that corresponds to the input reception area" is used, all of the input instructions may be disabled, or some of the input instructions may be disabled. The term "input instruction" used herein includes an input instruction that selects a character that has an attribute that is identical to that of the character that is operated based on the slide operation input, and an input instruction that corresponds to a command that differs from the command selected based on the touch operation.

The term "game process" used herein includes an action control process that effects attack on an enemy character or a given operation (operation in a simulation game), a movement control process that controls the movement of the operation target character, an action control process or a movement control process performed on another character in connection with the above process, a parameter calculation process, and a game calculation process based on these processes.

(2) The terminal device may further include a determiner that determines whether or not the first input reception area and the second input reception area are identical to each other or belong to an identical type, and the input controller may disable the input instruction that corresponds to the second input reception area as the given input instruction when it has been determined that the first input reception area and the second input reception area are identical to each other or belong to an identical type.

According to this configuration, since the terminal device can disable the input instruction that corresponds to the second input reception area as the given input instruction when the first input reception area and the second input reception area are identical to each other or belong to an identical type, it is possible to implement an appropriate operation using a simple process while eliminating unnecessary (overlapping) processes.

(3) In the terminal device, the input instruction that corresponds to the first input reception area and the input instruction that corresponds to the second input reception area may be instructions that instruct to implement a specific command that performs a specific control process on a character that is operated by the player, and the game controller may continue the game process on the character performed by the specific command based on the slide operation input that has been performed to directly follow the touch operation input performed when the specific command was received and detected by the second detection process.

According to this configuration, when the specific control process based on a given specific command is being performed on the operation target character (e.g., player character), and the slide operation input that corresponds to the character is being performed, the terminal device can disable the reception of the input of another specific command that differs from the given specific command, and continue the game process based on the touch operation input and the slide operation input.

Therefore, the terminal device can control the specific command selected based on the touch operation input that corresponds to the slide operation input while controlling the player character corresponding to the slide operation input. The terminal device can thus disable an unintentional operation input performed by the player, and implement an appropriate operation control process even when a plurality of input reception areas for selecting a plurality of specific commands are formed within an area in which the slide operation input can be performed, for example.

Note that the term "specific command" used herein includes a control command other than a command that moves the player character. For example, when the game is a battle game, the term "specific command" used herein includes a control command that can be implemented by the player character that moves (e.g., attack or defense command).

The term "slide operation input that has been performed to directly follow the touch operation input performed when the specific command was received and detected by the second detection process" used herein includes an operation input that controls the movement of the operation target player character, and a slide operation input for selecting the operation target, for example.

(4) In the terminal device, the game controller may perform the game process that controls movement of the character that is operated by the player within a game space based on the slide operation input that has been performed to directly follow the touch operation input performed when the specific command was received and detected by the second detection process.

According to this configuration, the terminal device can perform a specific control process (selection control process) based on a given specific command on the operation target character, and control the movement of the character within the game space.

Therefore, the terminal device can disable an unintentional operation input performed by the player, and implement an appropriate operation control process even when a plurality of input reception areas that correspond to specific commands are formed within an area in which the slide operation input that controls the movement of the player character can be performed.

The terminal device can increase the degree of freedom (in terms of design) with regard to the arrangement of the input reception area that corresponds to the specific command.

(5) In the terminal device, the first input reception area and the second input reception area may correspond to characters that can be operated by the player.

According to this configuration, the terminal device can select the operation target player character, for example.

Therefore, it is possible to easily link the player character and the specific command, or easily link the player character and an enemy character, using the slide operation input that can relatively easily performed on the touch panel.

Moreover, the terminal device can control the movement of the selected player character without switching the player character from the selected player character to another player character even when the selected player character has intersected another player character when the movement of the character within the game space is controlled corresponding to the slide operation input. Therefore, it is possible to disable an unintentional operation input performed by the player, and implement an appropriate operation control process.

(6) In the terminal device, when the slide operation input performed to directly follow the touch operation input performed when the input instruction that selects the character that is operated by the player was received is being detected by the second detection process, the input controller may disable the input instruction that corresponds to the character that has an attribute that is identical to that of the character that is operated by the player that has been selected based on the input reception area, and enable the input instruction that corresponds to the character that has an attribute that differs from that of the character that is operated by the player that has been selected based on the input reception area.

According to this configuration, when the slide operation input is used when implementing a game in which the selected player character battles with an enemy character, the terminal device disables the switching from the selected player character to another player character during the slide operation input, and enables the input instruction that corresponds to the enemy character that has an attribute that differs from that of the selected player character. Therefore, it is possible to select the enemy character.

Therefore, the terminal device can determine the player character and the enemy character selected based on the touch operation input and the slide operation input that follows the touch operation input. Accordingly, the terminal device can disable an unintentional operation input performed by the player, and implement an appropriate operation control process when implementing a game in which the player character battles with the enemy character based on the slide operation input, for example.

Note that a character is determined to have an attribute that is identical to or differ from that of the character that is operated by the player when the character is identical to or differ from that of the character that is operated by the player as to the type (e.g., enemy, ally, level, or category) or the attribute (e.g., "fire" or "water"), for example.

(7) In the terminal device, the input controller acquires power relating to the game that is linked to the second input reception area when the slide operation input on the input reception area has been detected when the slide operation input that is performed to directly follow the touch operation input performed when the input instruction regarding the game process was received is being detected by the second detection process, and a given condition with regard to the slide operation input has been satisfied, and the game controller performs the game process based on the input instruction received by the input controller, the slide operation input performed to directly follow the touch operation input performed when the input instruction was received, and the acquired power.

According to this configuration, the terminal device can enhance the power of the player character that is operated by the player when the given condition has been satisfied (e.g., (a) when the input instruction that corresponds to the detected slide operation input is an input instruction that corresponds to a character that has an attribute that is identical to that of the operation target character (e.g., an input instruction that corresponds to a character of the same type), or (b) when a specific command has been selected based on the touch operation input that corresponds to the slide operation input, and the input instruction that selects the specific command, the command that is linked to the operation target character, or a common command has been performed), for example.

Therefore, the terminal device can provide novel game playability based on the slide operation input, and provide an attractive game.

Note that the term "power" used herein that is acquired by the input controller refers to the power of the operation target character, such as the addition of a weapon used for attack (e.g., bullets), a parameter used for the game such as hit points and an attack parameter, quickness (high moving speed), and an attack type (e.g., killer shot or combo attack).

(8) The terminal device may further include a notification controller that issues a notification for determining the input instruction received by the input controller.

According to this configuration, the terminal device can display a display for determining the input instruction received by the input controller within the screen, or notify the player of the input instruction using vibrations, or notify the player of the input instruction using sound. Therefore, it is possible to allow the player to determine the input instruction that is being effected, and provide improved operability to the player.

(9) In the terminal device, the input controller may stop a process that disables the given input instruction that corresponds to the second input reception area when a given condition has been satisfied during the game process based on the input instruction that corresponds to the first input reception area.

According to this configuration, the terminal device can stop (terminate) the game process based on the specific command without performing any operation when the slide operation input has been stopped, or it has become impossible to continue the game process based on the specific command due to a decrease in attack power, running out of weapons, or the like. This makes it possible to improve convenience to the player.

(10) The terminal device may further include a parameter management controller that manages a variable parameter that changes corresponding to the slide operation input detected by the second detection process, the a touch operation detector may perform a third detection process that detects a state in which the touch operation input on the screen is not performed during the slide operation input detected by the second detection process, the input controller may disable the input instruction that corresponds to the second input reception area as the given input instruction until the variable parameter reaches a given value, and the game controller may perform the game process based on the input instruction received by the input controller when the third detection process has detected a state in which the touch operation input on the screen is not performed when the variable parameter has reached the given value.

According to this configuration, the terminal device can perform the game process by utilizing the slide operation input and the variable parameter in combination. This makes it possible to provide a novel attractive game.

(11) In the terminal device, when the slide operation input on the second input reception area has been detected by the second detection process when the variable parameter has reached the given value, the input controller may receive the input instruction that corresponds to the second input reception area, and the game controller may perform the game process based on the received input instruction that corresponds to the second input reception area.

According to this configuration, the terminal device can perform the game process by utilizing the slide operation input and the variable parameter in combination. This makes it possible to provide a novel attractive game.

Note that the terminal device may be implemented by a computer, acquire a program that causes a computer to function as each section (see above) from a computer-readable information storage medium, and implement each section (see above) by executing the program.

(12) According to another embodiment of the invention, a terminal device receives a slide operation input that has been performed on a touch panel on which a given screen is displayed, the terminal device including:

a touch operation detector that performs a first detection process that detects a touch operation input that has been performed in a state in which no touch operation input is performed on the screen, and a second detection process that detects a slide operation input that has been performed to directly follow the touch operation input detected by the first detection process;

a display controller that displays an input reception area within the screen, the input reception area being used to receive an operation input performed by a user;

input controller that receives an input instruction based on the operation input performed on the input reception area; and control means that performs a given process based on the input instruction received by the input controller, and the slide operation input that has been performed to directly follow the touch operation input when the input instruction was received, wherein the input controller receives the input instruction that corresponds to a first input reception area when the touch operation input on the first input reception area has been detected by the first detection process, and disables a given input instruction that corresponds to a second input reception area that differs from the first input reception area when the slide operation input that is performed to directly follow the touch operation input performed when the input instruction was received is being detected by the second detection process, and the slide operation input on the second input reception area has been detected.

According to this configuration, the terminal device can disable (does not receive) the input instruction that corresponds to the second input reception area, and continue the given process based on the input instruction that corresponds to the first input reception area, the touch operation input, and the slide operation input when the slide operation input has been performed on the second input reception area in a state in which the slide operation input is being performed to directly follow the touch operation input performed when the input instruction regarding the game process was received.

Therefore, the terminal device determines that the user is performing the slide operation input based on the character that is being operated or the specific command that has been selected when the slide operation input is being performed to directly follow the touch operation input performed when the input instruction was received, and disables the input instruction that corresponds to the second input reception area.

Since the terminal device can perform the given process based on an intentional operation performed by the player without performing a control process based on an unintentional operation performed by the player even when a touch panel for which it is difficult to perform a fine operation is used, it is possible to improve operability when performing the touch operation input and the slide operation input.

Exemplary embodiments of the invention are described below. Note that the following exemplary embodiments do not unduly limit the scope of the invention as stated in the claims. Note also that all of the elements described below should not necessarily be taken as essential elements of the invention.

1. Game System

An outline and a schematic configuration of a game system 1 according to one embodiment of the invention are described below with reference to FIG. 1. Note that FIG. 1 illustrates an example of the configuration of the game system 1 according to one embodiment of the invention.

As illustrated in FIG. 1, the game system 1 according to one embodiment of the invention is configured so that a server 10 that provides a game service and a terminal device 20 (e.g., terminal devices 20A, 20B, and 20C) can connect to the Internet (i.e., network).

The user can play the game that is transmitted from the server 10 through the Internet by accessing the server 10 from the terminal device 20. The user can communicate with another user by accessing the server 10 from the terminal device 20.

The server 10 is an information processing device that can provide a service that allows the user to play the game using the terminal device 20 that is communicably connected to the server 10 through the Internet. The server 10 may also function as an SNS server that provides a communication-type service. The SNS server may be an information processing device that provides a service that allows a plurality of users to communicate with each other.

For example, when the server 10 functions as the SNS server, the server 10 can provide a game that is referred to as a social game that is implemented by utilizing the operating environment (e.g., application programming interface (API) or platform) provided by the SNS.

The server 10 can provide a game that is provided on a web browser that runs on the terminal device 20 (e.g., a browser game (i.e., a game that starts when the user has opened the game website using the web browser) written in an arbitrary language (e.g., HTML, FLASH, CGI, PHP, shockwave, Java (registered trademark) applet, or JavaScript (registered trademark))).

Note that the term "social game" used herein includes a game that does not require dedicated client software (differing from existing online games), and can be played using only a web browser and an SNS account. The server 10 can provide an online game that is designed so that each terminal connects to a terminal (e.g., smartphone, personal computer, or game device) of another user through a network, and the terminals share the game online.

The server 10 may include a single device or processor, or may include a plurality of devices or processors.

Information (e.g., charge information and game information) that is stored in a storage area (database 140 described later) of the server 10 may be stored in a database (storage device or memory in a broad sense) that is connected through a network (intranet or Internet). When the server 10 functions as the SNS server, information (e.g., user information 146) stored in the storage area may be stored in a database (storage device or memory in a broad sense) that is connected through a network (intranet or Internet).

More specifically, the server 10 according to one embodiment of the invention receives input information based on an operation performed by the user (i.e., the player who plays the game) of the terminal device 20, and performs a game process based on the received input information. The server 10 transmits the game processing results to the terminal device 20, and the terminal device 20 performs various processes that provide the game processing results received from the server 10 to the user so that the user can view the game processing results.

The terminal device 20 is an information processing device such as a smartphone, a mobile phone, a PHS, a computer, a game device, a PDA, a portable game machine, or an image generation device, and can connect to the server 10 through a network (e.g., Internet (WAN) and LAN). Note that the terminal device 20 and the server 10 may be connected through a cable communication channel, or may be connected through a wireless communication channel.

The terminal device 20 is provided with a web browser that allows the user to browse a web page (HTML format data). Specifically, the terminal device 20 has a communication control function for communicating with the server 10, a web browser function for displaying an image using data (e.g., web data or HTML data) received from the server 10, and transmitting user operation data to the server 10, and the like. The terminal device 20 performs various processes that provide a game screen to the user, and allows the user to play the game. Note that the terminal device 20 may acquire game control information from the server 10, and perform a predetermined game process to implement a game based on the game process.

Specifically, when the terminal device 20 has transmitted a predetermined game play request to the server 10, the terminal device 20 is connected to the game website provided by the server 10, and the game starts. The terminal device 20 is configured to cause the server 10 that functions as an SNS server to perform a predetermined process, or acquire user information 146 that is managed by the server 10 that functions as an SNS server optionally using an API, and implements the game.

2. Server

Figure 2:
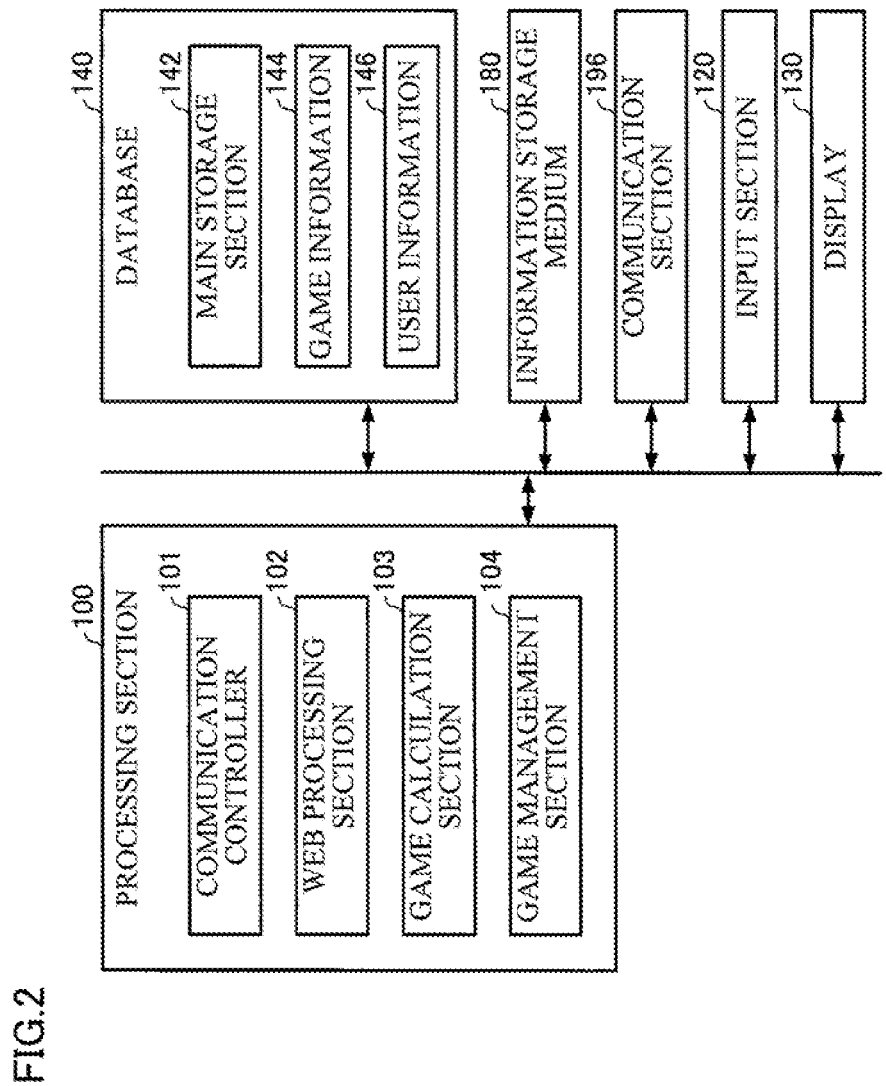
FIG. 2 illustrates an example of a functional block diagram of a server according to one embodiment of the invention.

The server 10 according to one embodiment of the invention is described below with reference to FIG. 2. Note that FIG. 2 illustrates the functional blocks of the server 10 according to one embodiment of the invention. The server 10 according to one embodiment of the invention may have a configuration in which some of the elements (sections) illustrated in FIG. 2 are omitted.

The server 10 includes an input section 120 that allows the administrator and the like to input information, a display 130 that displays a predetermined screen, an information storage medium 180 that stores predetermined information, a communication section 196 that communicates with the terminal device 20 and the like, a processing section 100 that mainly performs a process that implements the game that is provided by the server 10, and a database 140 that mainly stores various types of data used to implement the game.

The input section 120 allows the system administrator and the like to input game settings, other necessary settings, and data. For example, the input section 120 according to one embodiment of the invention is implemented by a mouse, a keyboard, or the like.

The display 130 displays an operation screen for the system administrator. For example, the display 130 according to one embodiment of the invention is implemented by a liquid crystal display or the like.

The information storage medium 180 (computer-readable medium) stores a program, data, and the like. The function of the information storage medium 180 is implemented by an optical disk (CD or DVD), a magneto-optical disk (MO), a magnetic disk, a hard disk, a magnetic tape, a memory (ROM), or the like.

The communication section 196 performs a control process for communicating with the outside (e.g., terminal, another server, or another network system). The function of the communication section 196 is implemented by hardware such as a processor or a communication ASIC, a program, or the like.

The database 140 serves as a work area for the processing section 100, the communication section 196, and the like. The function of the database 140 is implemented by a RAM (VRAM) or the like. Note that the information stored in the database 140 may be managed using a database.

In one embodiment of the invention, the database 140 stores game information 144 that represents information about the game that is provided by the server 10, the user information 146 that represents information about the user (player) who plays the game that is provided by the server 10, and various types of information necessary for the game calculation process.

The processing section 100 performs various processes using a main database 142 included in the database 140 as a work area. The function of the processing section 100 may be implemented by hardware such as a processor (e.g., CPU or DSP) or an ASIC (e.g., gate array), or a program.

The processing section 100 performs various processes according to one embodiment of the invention based on a program (data) stored in the information storage medium 180. Specifically, a program that causes a computer to function as each section according to one embodiment of the invention (i.e., a program that causes a computer to execute the process of each section) is stored in the information storage medium 180.

For example, the processing section 100 (processor) performs various processes such as a process that controls the entire server 10 and a process that controls data transfer between each section based on the program stored in the information storage medium. The processing section 100 also performs a process that provides various services in response to a request from the terminal device 20.

More specifically, the processing section 100 according to one embodiment of the invention includes at least a communication controller 101, a web processing section 102, and a game management section 104.

The communication controller 101 performs a process that exchanges data with the terminal device 20 through a network. Specifically, the server 10 performs various processes based on information received from the terminal device 20 and the like through the communication controller 101.

The communication controller 101 according to one embodiment of the invention performs a process that transmits a game screen to the terminal device 20 of the user based on a request from the terminal device 20 of the user.

The web processing section 102 functions as a web server. For example, the web processing section 102 performs a process that transmits data in response to a request from the web browser installed on the terminal device 20 through a communication protocol such as Hypertext Transfer Protocol (HTP), and performs a process that receives data transmitted by the web browser installed on the terminal device 20.

Although an example in which the server 10 also functions as the SNS server is described below, the server 10 may be implemented by a game server and an SNS server that are provided separately. Part or the entirety of the game process according to one embodiment of the invention may be implemented by the server 10, or part of the game process according to one embodiment of the invention may be implemented by the terminal device 20.

The game management section 104 performs the game process that implements a role-playing game (RPG) or a battle game that is played by each player in cooperation with the terminal device 20 based on operation information about the player that has been input through the terminal device 20, and manages the user information 146 (e.g., the progress of the game played by each user, item management, a character and various items used by each user).

Note that the game management section 104 may perform an automatic calculation process that automatically implements the game based on various types of data set by the user without using an operation performed by the user to generate data for the terminal device 20 to replay the game, and transmit the generated data to the terminal device 20.

3. Terminal Device

Figure 3:
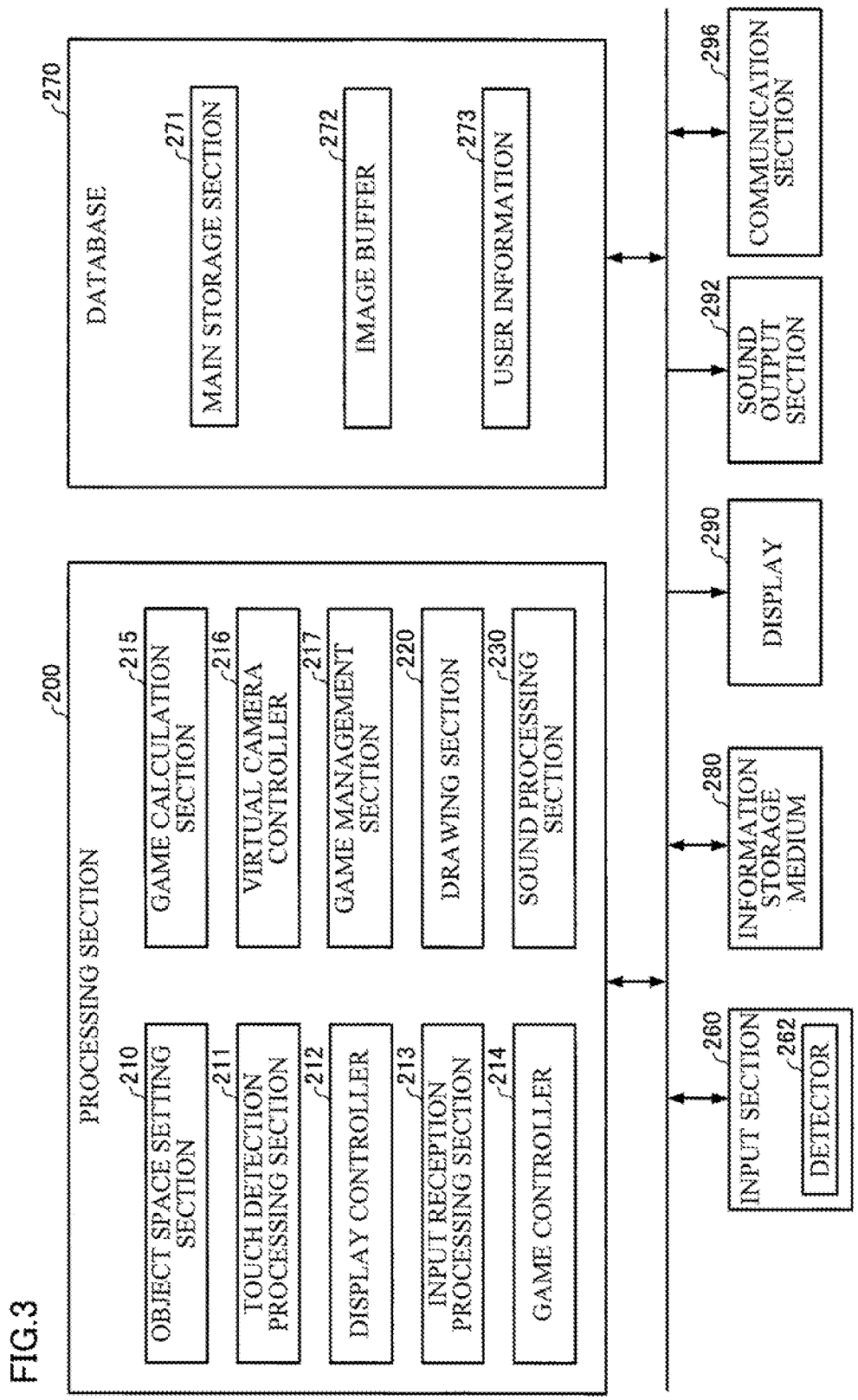
FIG. 3 illustrates an example of a functional block diagram of a terminal device according to one embodiment of the invention.
Figure 4A:
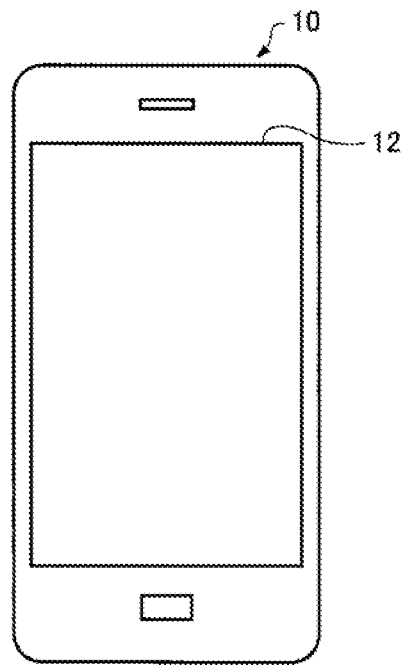
FIGS. 4A and 4B illustrate an example of the external configuration of a terminal device according to one embodiment of the invention.
Figure 4B:
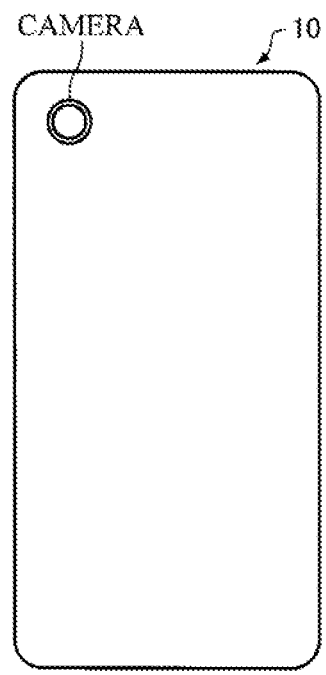

The terminal device 20 according to one embodiment of the invention is described below with reference to FIGS. 3 to 4B. Note that FIG. 3 is a functional block diagram illustrating an example of the configuration of the terminal device according to one embodiment of the invention, and FIGS. 4A and 4B illustrate an example of the external configuration of the terminal device according to one embodiment of the invention. Note that the terminal device 20 according to one embodiment of the invention may have a configuration in which some of the elements (sections) illustrated in FIG. 3 are omitted.

An input section 260 allows the player to input operation data. The function of the input section 260 may be implemented by a touch panel, a touch panel display, or the like. The input section 260 includes a detector 262 that can detect two-dimensional indication position coordinates (x, y) within a screen on which an image is displayed. For example, the detector 262 can detect two-dimensional touch position coordinates (x, y) within a touch detection area (touch panel).

In one embodiment of the invention, the touch position is represented by position information obtained from the touch detection area due to a touch operation (including a direct touch operation and an indirect touch operation performed using a pointing device) performed by the player.

In one embodiment of the invention, the touch operation performed by the player may be a touch operation or a slide operation that is performed by the user directly on a touch panel 12 with a finger, a touch operation or a slide operation that is performed by the user indirectly on the touch panel 12 using a device such as a pointing device, or a pseudo-touch operation or a pseudo-slide operation that is performed on the touch panel 12.

For example, the term "pseudo-touch operation" or "pseudo-slide operation" used herein includes a touch operation or a slide operation that is detected when the user has touched or approximately touched the touch panel 12, such as (1) a touch operation or a slide operation that is determined based on coordinates when a light beam (e.g., infrared rays) is applied at a position close to the surface of the touch panel parallel to the surface of the touch panel, and the coordinates in the vertical direction and the horizontal direction at which the light beam is blocked when the user has touched or approximately touched the touch panel 12 are detected using a plurality of irradiation sections (that are formed on one side of the touch panel 12 in the vertical direction and the horizontal direction at a given interval) and a plurality of sensors (that make a pair with each irradiation section, are provided on the other side of the touch panel opposite to each irradiation section, and receive the applied light beam), and (2) a touch operation or a slide operation that is determined based on position coordinates when a camera that captures the display screen of the touch panel 12 is provided, and the position coordinates at which the user has touched or approximately touched the touch panel 12 are detected using the camera.

When a plurality of touch positions have been simultaneously detected within the touch detection area, one of the plurality of touch positions (e.g., the touch position that has been detected first) may be used, or the plurality of touch positions may be processed simultaneously.

When a plurality of determination areas are present within the touch detection area, one touch position (e.g., the touch position that has been detected first) may be used corresponding to each determination area. Note that the determination area refers to a range within the touch detection area in which the touch position that is processed by the processing section 200 (e.g., movement control process) is determined in advance.

In one embodiment of the invention, a display screen (display) 12 illustrated in FIGS. 4A and 4B is implemented by a touch panel display in which a liquid crystal display and a touch panel that detects the touch position of the player (operator or user) are stacked. Specifically, the display screen 12 functions as the input section 260, and also functions as a display 290.

Note that a touch operation on the display screen (hereinafter referred to as "touch panel" except for a special case) 12 may be performed with a fingertip, or may be performed using an input device (e.g., touch pen).

The input section 260 may include a button, a lever, a keyboard, a steering wheel, a microphone, an acceleration sensor, or the like that allows the player to input operation information (operation signal) other than the indication position.

A database 270 serves as a work area for a processing section 200, a communication section 296, and the like. The function of the database 270 may be implemented by a RAM (VRAM) or the like. The database 270 according to one embodiment of the invention includes a main database 271 that is used as a work area, an image buffer 272 that stores the final display image and the like, user information 273 that represents information about the user (player) who plays the game that is provided by the server 10, and a game data database 274 that stores various types of data (e.g., table data) necessary for implementing the game. Note that the database 270 may have a configuration in which some of these sections (information) are omitted, or some of these sections (information) may be implemented by the database 140 of the server 10.

The main database 271 included in the storage section 270 according to one embodiment of the invention may store a reference position and an indication position acquired by a touch detection processing section 211, various marker images, condition information that represents conditions used for various determination processes, and the like.

An information storage medium 280 (computer-readable medium) stores a program, data, and the like. The function of the information storage medium 280 may be implemented by an optical disk (CD or DVD), a magneto-optical disk (MO), a magnetic disk, a hard disk, a magnetic tape, a memory (ROM), or the like.

A program that causes a computer to function as each section according to one embodiment of the invention (i.e., a program that causes a computer to execute the process performed by each section) may be stored in the information storage medium 280. Note that the processing section 200 performs various processes according to one embodiment of the invention based on the program (data) stored in the information storage medium 280 (as described later).

The display 290 outputs an image generated according to one embodiment of the invention. The function of the display 290 may be implemented by a CRT, an LCD, a touch panel display, a head-mounted display (HMD), or the like.

In one embodiment of the invention, the display 290 utilizes a touch panel display, and functions as the input section 260 through which the player performs a game operation. A resistive (4-wire or 5-wire) touch panel, a capacitive touch panel, an electromagnetic induction touch panel, an ultrasonic surface acoustic wave touch panel, an infrared scan touch panel, or the like may be used as the touch panel.

A sound output section 292 outputs sound generated according to one embodiment of the invention. The function of the sound output section 292 may be implemented by a speaker, a headphone, or the like.

The communication section 296 performs various control processes for communicating with the outside (e.g., host device or another terminal device). The function of the communication section 296 may be implemented by hardware such as a processor or a communication ASIC, a program, or the like.

Note that the terminal device 20 may receive a program and data that are stored in the information storage medium or the database 270 included in the server 10 and cause a computer to function as each section according to one embodiment of the invention through a network, and store the received program and data in the information storage medium 280 or the database 270. A case where the terminal device 20 receives a program and data, and operates based on the received program and data is also included within the scope of the invention.

The processing section 200 (processor) performs a game process, an image generation process, a sound generation process, and the like in cooperation with the server 10 based on data input from the input section 260, a program, and the like.

The game process according to one embodiment of the invention includes a process that starts the game when game start conditions have been satisfied, a process that proceeds with the game, a process that disposes an object such as a player object or an enemy object, a process that displays the object, a process that calculates the game results, a process that terminates the game when game termination conditions have been satisfied, and the like.

The processing section 200 performs various processes using the database 270 as a work area. The function of the processing section 200 may be implemented by hardware such as a processor (e.g., CPU or DSP) or an ASIC (e.g., gate array), or a program.

The processing section 200 according to one embodiment of the invention includes an object space setting section 210, the touch detection processing section 211, a display controller 212, an input reception processing section 213, a game controller 214, a game calculation section 215, a virtual camera controller 216, a game management section 217, a drawing section 220, and a sound processing section 230. Note that the processing section 200 may have a configuration in which some of these sections are omitted.

For example, the touch detection processing section 211 according to one embodiment of the invention serves as the input detector according to the invention, and the display controller 212 according to one embodiment of the invention serves as the a display controller and the notification controller according to the invention. For example, the input reception processing section 213 according to one embodiment of the invention serves as the input receiving means and the determiner according to the invention, and the game controller 214 according to one embodiment of the invention serves as the game controller according to the invention. For example, the game calculation section 215 according to one embodiment of the invention corresponds to the parameter management controller according to the invention.

The object space setting section 210 disposes (sets) an object (i.e., an object formed by a primitive surface such as a sprite, a billboard, a polygon, a free-form surface, or a subdivision surface) that represents a display object (e.g., object (player object, moving object, or enemy object), moving path, building, tree, pillar, wall, or map (geographical feature)) in an object space.

More specifically, the object space setting section 210 determines the position and the rotation angle (synonymous with orientation or direction) of an object (model object), and disposes the object at the determined position ((X, Y) or (X, Y, Z)) and the determined rotation angle (rotation angles around X-axis and Y-axis or rotation angles around X-axis, Y-axis, and Z-axis).

The term "object space" used herein includes a virtual two-dimensional space and a virtual three-dimensional space. The two-dimensional space is a space in which the object is disposed at two-dimensional coordinates (X, Y), and the three-dimensional space is a space in which the object is disposed at three-dimensional coordinates (X, Y, Z), for example.

When the object space is a two-dimensional space, the object space setting section 210 disposes each object based on the priority set to each object. For example, the object space setting section 210 may perform a process that disposes each object in order from an object (sprite) that should be disposed on the deep side, and disposes an object that should be disposed on the front side so as to overlap the object that has been disposed.

It is possible to generate an image in which an object space that corresponds to the upper side of the screen is disposed on the deep side, and an object space that corresponds to the lower side of the screen is disposed on the front side by disposing an object having a large drawing size on the lower side of the image, and disposing an object having a small drawing size on the upper side of the image.

When the object space is a three-dimensional space, the object space setting section 210 disposes the object in a world coordinate system.

The touch detection processing section 211 performs a determination process on input information that has been input by the player using the input section 260. More specifically, the touch detection processing section 211 according to one embodiment of the invention acquires an indication position that has been input using the input section 260.

For example, the touch detection processing section 211 acquires a touch position (two-dimensional touch position coordinates) within the touch detection area (touch panel) that detects a touch operation performed by the player as the indication position.

Specifically, the touch detection processing section 211 acquires a touch position (indication position) within a touch operation period (slide operation period) that corresponds to a period in which the player touches the touch panel 12 with a finger (hereinafter referred to as "touch operation input"), and removes the finger from the touch panel 12 after moving the finger on the touch panel 12 (hereinafter referred to as "slide operation").

The touch detection processing section 211 performs (1) a first detection process that detects a first change from a state in which a touch operation input on the screen is not performed (hereinafter referred to as "non-touch state") to a state in which a touch operation input is performed (hereinafter referred to as "touch state") (hereinafter referred to as "change in state"), and detects a detection position at which the change in state has occurred (hereinafter referred to as "reference position"), (2) a second detection process that detects a second change that is a change in input using a slide operation (hereinafter referred to as "slide operation input") (i.e., indication position and change in indication position) when a slide operation input has been performed to directly follow the touch operation input performed when the first change was detected (when the change from the non-touch state to the touch state occurred), and (3) a third detection process that detects a state in which a touch operation input on the screen is not performed during the slide operation input (i.e., change from the touch state to the non-touch state upon completion of the slide operation input).

The touch detection processing section 211 acquires the input indication position in a predetermined cycle. The predetermined cycle may be about ⅙₀th of a second to about ¹⁄₁₂₀th of a second (=one frame), for example.

In one embodiment of the invention, the terms "reference position" and "indication position" include a position on the touch panel 12 detected based on a touch operation input or a slide operation input, a position situated away from the detection position by a predetermined distance, and a predetermined position that is linked to a specific position on the touch panel 12, such as an area formed within a predetermined area (e.g., corner) of the touch panel 12.

The display controller 212 displays an input reception area on the touch panel 12, the input reception area being used to receive an operation input performed by the player who plays the game.

The term "input reception area" used herein refers to an area for detecting an input instruction that is linked to an area on the touch panel 12 in which the game space is displayed, or an area that is formed separately from the display area of the game space, when the player has performed a touch operation input or a slide operation input on the area.

The input reception area may be displayed in a predetermined area on the touch panel 12 in a stationary state, or may be displayed so as to be movable within the screen. For example, the input reception area is an area for inputting a specific command that performs a specific control process on a player character that is operated by the player, or an area in which the player character is displayed (i.e., an area for selecting the player character that is displayed within the game space in a stationary state or a moving state).

The input reception processing section 213 receives an input instruction based on an operation input performed by the player on the input reception area, and outputs the received input instruction to the game controller 214.

The input reception processing section 213 receives an instruction that instructs to implement a specific command that performs a specific control process on the player character that is operated by the player, and an instruction that instructs to select one character from a plurality of characters that can be operated by the player, as the input instruction that corresponds to the input reception area.

The input reception processing section 213 (1) receives an input instruction regarding the game process based on a command that corresponds to a first input reception area when a touch operation input on the first input reception area has been detected by the touch detection processing section 211, and (2) disables a given input instruction (some or all of the input instructions described later) that corresponds to a second input reception area that differs from the first input reception area when a slide operation input that is performed to directly follow the touch operation input performed when the input instruction regarding the game process was received is being detected by the second detection process, and a slide operation input on the second input reception area has been detected.

The input reception processing section 213 determines whether or not the first input reception area and the second input reception area are identical to each other or belong to an identical type, and disables an input instruction that corresponds to the second input reception area as a given input instruction when it has been determined that the first input reception area and the second input reception area are identical to each other or belong to an identical type.

It is determined that the first input reception area and the second input reception area belong to an identical type when an input instruction for selecting an identical specific command or an identical player character is linked to the first input reception area and the second input reception area, or an identical attribute (e.g., type of character or category), identical display characteristics (e.g., size, shape, or design), and the like are assigned to the first input reception area and the second input reception area, for example.

The input reception processing section 213 may enable or disable an input instruction corresponding to a variable parameter (described later).

The game controller 214 performs the game process based on the command received by the input reception processing section 213, the slide operation input performed to directly follow the touch operation input when the command was received, and the command.

The game controller 214 performs a control process on the character (i.e., player character) that is operated based on the command (i.e., input instruction) received by the input reception processing section 213, or performs a control process on another character such as an enemy character.

For example, when the game is a battle game or a shooting game, the game controller 214 according to one embodiment of the invention performs a specific support process that attacks the enemy character, or recovers the power of the character. When the game is a simulation game, the game controller 214 performs a predetermined creation/building process.

The game controller 214 controls the movement of the operation target character within the game space based on the slide operation input that is being performed to directly follow the touch operation input that selects the operation target player character and detected by the second detection process.

The game controller 214 performs a movement calculation process that calculates the movement of the operation target character object such as a moving object (particularly a character object such as the player character or the enemy character) within the object space.

Specifically, the game controller 214 performs a process that moves the moving object within the object space, or controls the motion (animation) of the moving object based on the input data input by the player using the input section 260, a program (movement algorithm), data (motion data), and the like.

More specifically, the game controller 214 according to one embodiment of the invention performs a simulation process that sequentially calculates movement information (moving direction, moving amount, moving speed, position, rotation angle, or acceleration) and motion information (position or rotation angle of each part object) about the object every frame. Note that the term "frame" used herein refers to a time unit used when performing the object movement/motion process (simulation process) or the image generation process. In one embodiment of the invention, the frame rate may be fixed, or may be changed corresponding to the processing load.

Note that the game controller 214 may perform a process that moves the object in a three-dimensional object space based on the input direction. For example, a moving direction is linked to each input direction in advance, and the game controller 214 moves the object in the moving direction that corresponds to the input direction.

The game controller 214 may perform the process in cooperation with the server 10, or the game controller 214 may be partially or entirely implemented by the server 10.

The game calculation section 215 performs various game calculation processes. When a plurality of player characters used in the game are set as a deck based on instructions issued by the player, the game calculation section 215 performs a process that proceeds with the game using each player character set to the deck.

The game calculation section 215 performs a game calculation process necessary for forming a predetermined object space of a shooting game, forming an object space based on a map, proceeding with the game based on a scenario sot in advance based on an operation performed by the user, causing the player object (operation target object) to battle with the enemy object or another object (non-operation target object), and managing a parameter during the battle.

The game calculation section 215 manages the variable parameter corresponding to the slide operation input detected by the second detection process, and displays the result on the touch panel 12 as a gauge in cooperation with the display controller 212.

The game calculation section 215 performs the process in cooperation with the server 10. Note that the game calculation section 215 may be partially or entirely implemented by the server 10.

The virtual camera controller 216 generates an image that is viewed from a given viewpoint and has a depth. In this case, the virtual camera controller 216 performs a process that controls a virtual camera (viewpoint) for generating an image viewed from a given (arbitrary) viewpoint within the object space. Specifically, the virtual camera controller 216 performs a process that controls the position (X, Y, Z) or the rotation angle (rotation angles around X-axis, Y-axis, and Z-axis) of the virtual camera (i.e., a process that controls the viewpoint position or the line-of-sight direction).

For example, when imaging the object (e.g., character, ball, or car) from behind using the virtual camera, the virtual camera controller 216 controls the position or the rotation angle (orientation) of the virtual camera so that the virtual camera follows a change in the position or the rotation of the object.

In this case, the virtual camera controller 216 may control the virtual camera based on information about the position, the rotation angle, the speed, and the like of the object obtained by the game controller 214. Alternatively, the virtual camera controller 216 may rotate the virtual camera by a predetermined rotation angle, or may move the virtual camera along a predetermined path. In this case, the virtual camera controller 216 controls the virtual camera based on virtual camera data that represents the position (moving path) or the rotation angle of the virtual camera.

When a plurality of virtual cameras (viewpoints) are provided, the virtual camera controller 216 performs the above control process corresponding to each virtual camera.

The game management section 217 sets the player character and various items used by each player in the game such as a battle game based on the operation input by the player using the input section 260, and registers the player character and the items in the user information 273.

When the game is implemented using a deck, the game management section 217 registers the player character and the items in the user information 273 as deck data.

The drawing section 220 performs a drawing process based on the results of various processes (game process) performed by the processing section 200 to generate an image, and outputs the generated image to the display (display) 290. The drawing section 220 may generate a two-dimensional image, or may generate a three-dimensional image. The drawing section 220 generates an image that is viewed from the virtual camera within the object space, and is displayed within the screen.

When the drawing section 220 generates a two-dimensional image, the drawing section 220 draws each object in order from an object with the lowest priority, and draws an object with a higher priority over the object that has been drawn when an overlap occurs.

When the drawing section 220 generates a three-dimensional game image, the drawing section 220 receives object data (model data) including vertex data (e.g., vertex position coordinates, texture coordinates, color data, normal vector, or alpha-value) that represents each vertex of the object (model), and performs a vertex process based on the vertex data included in the input object data. The drawing section 220 may optionally perform a vertex generation process (tessellation, curved surface division, or polygon division) for subdividing the polygon when performing the vertex process.

When the drawing section 220 performs the vertex process, the drawing section 220 performs a vertex movement process and a geometric process (e.g., coordinate transformation (world coordinate transformation or camera coordinate transformation), clipping, perspective transformation, or light source process), and changes (updates or adjusts) the vertex data that represents each vertex that forms the object based on the processing results. The drawing section 220 performs a rasterization process (scan conversion process) based on the vertex data subjected to the vertex process to link the surface of the polygon (primitive) to pixels. The drawing section 220 then performs a pixel process (fragment process) that draws the pixels that form the image (fragments that form the display screen).

When the drawing section 220 performs the pixel process, the drawing section 220 determines the final drawing color of each pixel by performing a texture reading (texture mapping) process, a color data setting/change process, a translucent blending process, an anti-aliasing process, and the like, and outputs (draws) the drawing color of the object subjected to perspective transformation to the image buffer 272 (i.e., a frame buffer or a buffer that can store image information on a pixel basis (VRAM or rendering target)). Specifically, the pixel process includes a per-pixel process that sets or changes the image information (e.g., color, normal, luminance, and alpha-value) on a pixel basis.

The drawing section 220 thus generates an image that is viewed from the virtual camera (given viewpoint) set within the object space. When a plurality of virtual cameras (viewpoints) are provided, the drawing section 220 may generate an image so that images (segmented images) viewed from the respective virtual cameras are displayed within one screen.

The vertex process and the pixel process performed by the drawing section 220 may be implemented by hardware that enables a programmable polygon (primitive) drawing process (i.e., programmable shader (vertex shader or pixel shader)) according to a shader program written in shading language. The programmable shader enables a programmable per-vertex process and per-pixel process, increases the degree of freedom with respect to the drawing process, and significantly improves the representation capability as compared with a fixed hardware drawing process.

The drawing section 220 performs a geometric process, a texture mapping process, a hidden surface removal process, an alpha-blending process, and the like when drawing the object.

The geometric process includes subjecting the object to a coordinate transformation process, a clipping process, a perspective projection transformation process, a light source calculation process, and the like. The drawing section 220 stores the object data (e.g., object's vertex position coordinates, texture coordinates, color data (luminance data), normal vector, or alpha-value) after the geometric process (after perspective transformation) in the database 270.

The texture mapping process includes a process that maps a texture (texel value) stored in a texture database included in the database 270 onto the object. Specifically, the drawing section 220 reads a texture (surface properties such as color (RGB) and alpha-value) from the texture database included in the database 270 using the texture coordinates set (assigned) to each vertex of the object and the like, and maps the texture (two-dimensional image) onto the object. In this case, the drawing section 220 performs a pixel-texel link process, a bilinear interpolation process (texel interpolation process), and the like.

Note that the drawing section 220 may perform a process that maps a given texture onto the object when drawing the object. In this case, it is possible to dynamically change the color distribution (texel pattern) of the texture to be mapped onto the object.

In this case, a texture that has a different color distribution (pixel pattern) may be dynamically generated, or a plurality of textures that differ in color distribution may be provided in advance, and dynamically selected. The color distribution of the texture may be changed on an object basis.

The drawing section 220 performs the hidden surface removal process using a Z-buffer method (depth comparison method or Z-test) that utilizes a Z-buffer (depth buffer) that stores the Z-value (depth information) of the drawing target pixel. More specifically, the drawing section 220 refers to the Z-value stored in the Z-buffer when drawing the drawing target pixel that corresponds to the primitive of the object, and compares the Z-value stored in the Z-buffer with the Z-value of the drawing pixel of the primitive. When the Z-value of the drawing pixel is a Z-value (e.g., small Z-value) that indicates a position on the front side when viewed from the virtual camera, the drawing section 220 draws the drawing target pixel, and updates the Z-value stored in the Z-buffer with a new Z value.

When the drawing section 220 performs the alpha-blending process, the drawing section 220 performs a translucent blending process (e.g., normal alpha-blending process, additive alpha-blending process, or subtractive alpha-blending process) based on the alpha-value (A-value). Note that the alpha-value is information that can be stored so as to be linked to each pixel (texel or dot), such as additional information other than the color information. The alpha-value may be used as mask information, translucency (equivalent to transparency or opacity), bump information, or the like.

The drawing section 220 according to one embodiment of the invention may generate an image that is displayed within a display area that corresponds to the touch detection area. The image that is displayed within the display area may be an image that includes the object, for example.

The sound processing section 230 performs a sound process based on the results of various processes performed by the processing section 200 to generate game sound (e.g., background music (BGM), effect sound, or voice), and outputs the generated game sound to the sound output section 292.

Note that the terminal device according to one embodiment of the invention may be a system dedicated to a single-player mode that allows only one player to play the game, or may be a system that also implements a multi-player mode that allows a plurality of players to play the game.

When a plurality of players play the game, the game image and the game sound provided to the plurality of players may be generated using one terminal device 20, or may be generated by a distributed process using a plurality of terminal devices 20 or the server 10 connected through a network (transmission line or communication line) or the like.

4. Method 4.1. Outline

An outline of the method (i.e., a disabling process that is performed when a slide operation input is performed on the input reception area) according to one embodiment of the invention is described below.

The terminal device 20 according to one embodiment of the invention is configured to perform the game process that implements a shooting game, a battle part of an RPGG a simulation game, and the like.

The terminal device 20 according to one embodiment of the invention is configured to receive a touch operation input and a slide operation input that has been performed to directly follow the touch operation input, and control the game process that implements various games corresponding to the touch operation input and the slide operation input that have been received.

More specifically, the terminal device 20 according to one embodiment of the invention is configured to (1) perform a touch operation input detection process that includes a first detection process that detects a touch operation input that has been performed in a state in which no touch operation input is performed on the touch panel 12, and a second detection process that detects a slide operation input that has been performed to directly follow the touch operation input detected by the first detection process, (2) display an input reception area for receiving an operation input (that selects a command, an operation target character, or the like) performed by the player to play the game on the touch panel 12, (3) perform a process that receives an input instruction based on an operation input performed by the player on the input reception area displayed on the touch panel 12, and (4) perform a predetermined game process based on the received input instruction and the slide operation input that has been performed to directly follow the touch operation input so as to issue the input instruction.

The terminal device 20 according to one embodiment of the invention is configured to (3a) receive an input instruction regarding the game process that corresponds to a first input reception area when a touch operation input on the input reception area has been detected by the first detection process, and (3b) disable a given input instruction that corresponds to a second input reception area that differs from the first input reception area when a slide operation input that is performed to directly follow the touch operation input performed when the input instruction regarding the game process was received is being detected by the second detection process, and a slide operation input on the second input reception area has been detected.

The terminal device 20 according to one embodiment of the invention may be configured to determine whether or not the first input reception area and the second input reception area are identical to each other or belong to an identical type, and disable an input instruction that corresponds to the second input reception area as a given input instruction when it has been determined that the first input reception area and the second input reception area are identical to each other or belong to an identical type.

The terminal device 20 according to one embodiment of the invention that is configured as described above can disable (does not receive) an input instruction that corresponds to the second input reception area, and continue the game process based on the touch operation input and the slide operation input when a slide operation input has been performed on the second input reception area in a state in which a slide operation input is being performed to directly follow the touch operation input performed on the first input reception area so as to issue the input instruction regarding the game process.

It is normally difficult to finely perform a touch operation input or a slide operation input on a touch panel as compared with the case of using an arrow key or a joystick. In particular, a situation in which the player character that is being operated intersects another operation target player character, or a situation in which a slide operation input that selects a specific command passes through a display area of another command, may occur depending on the size of the screen, or the display state of the game screen displayed on the screen, for example.

Therefore, the terminal device 20 according to one embodiment of the invention is configured to determine that the player is performing a slide operation input based on the player character that is being operated or the specific command that has been selected when a slide operation input is being performed to directly follow the touch operation input performed when the input instruction regarding the game process was received, and disable an input instruction that corresponds to the input reception area, for example.

Since the terminal device 20 according to one embodiment of the invention is configured to proceed with the game based on an intentional operation performed by the player without performing a control process based on an unintentional operation performed by the player even when the touch panel 12 for which it is difficult to perform a fine operation is used, it is possible to improve the playability of a game that utilizes a touch panel, and provide an attractive game.

4.2. Basic Principle of Disabling Process that is Performed when Slide Operation Input is Performed on Input Reception Area The basic principle of the disabling process according to one embodiment of the invention that is performed when a slide operation input is performed on the input reception area is described below with reference to FIGS. 5A to 7B. Note that FIGS. 5A to 7B illustrate a player character selection control process based on a slide operation input according to one embodiment of the invention.

The disabling process according to one embodiment of the invention that is performed when a slide operation input is performed on the input reception area may be applied to various games such as a shooting game, a simulation game, an RGB game, or a racing game in which one command is selected from a plurality of commands, or one player character is selected from a plurality of operation target player characters, or one command is selected from a plurality of commands and one player character is selected from a plurality of operation target player characters.

The principle of the disabling process according to one embodiment of the invention that is performed when a slide operation input is performed on the input reception area is described below using (a) a shooting game in which the player causes the operation target player character selected in advance to attack an enemy character, (b) a battle game in which the player selects one operation target player character from a plurality of operation target player characters, and causes the selected player character to battle with an enemy character while controlling the movement of the selected player character within the game space (hereinafter referred to as "battle game 1"), and (c) a battle game in which the player causes one player character selected from a plurality of operation target player characters to implement one specific command selected from a plurality of specific commands to battle with an enemy character (hereinafter referred to as "battle game 2").

(a) Shooting Game

When implementing a shooting game in which the player causes the operation target player character selected in advance to attack an enemy character, the input reception processing section 213 (1) receives an input instruction regarding the game process (i.e., an input that selects the specific command) that corresponds to the input reception area when a touch operation input performed on the input reception area that is linked to the specific attack command has been detected by the first detection process (i.e., a process that detects a touch operation input that has been performed in a state in which no touch operation input is performed on the touch panel 12), and (2) disables a given input instruction that corresponds to the input reception area when a slide operation input performed on the input reception area has been detected in a state in which a slide operation input is being detected by the second detection process (i.e., a process that detects a slide operation input that has been performed to directly follow the touch operation input detected by the first detection process).

The game controller 214 performs the game process based on the selected command on the player character while controlling the movement of the operation target player character based on the slide operation input detected by the second detection process.

Specifically, when the game is a shooting game that utilizes a plurality of specific commands, and the input instruction that corresponds to the input reception area instructs to implement a specific command that performs a specific control process on the player character that is operated by the player, the input reception processing section 213 enables the command input based on the touch operation input detected by the first detection process.

When a touch operation has been performed on the input reception area in a state in which the movement of the operation target player character is being controlled based on the slide operation input that has been performed to directly follow the touch operation input, the input reception processing section 213 disables the command input on the input reception area based on the slide operation input.

In this case, the game controller 214 continues the game process on the player character based on the command selected by the touch operation input detected by the first detection process.

Figure 5A:
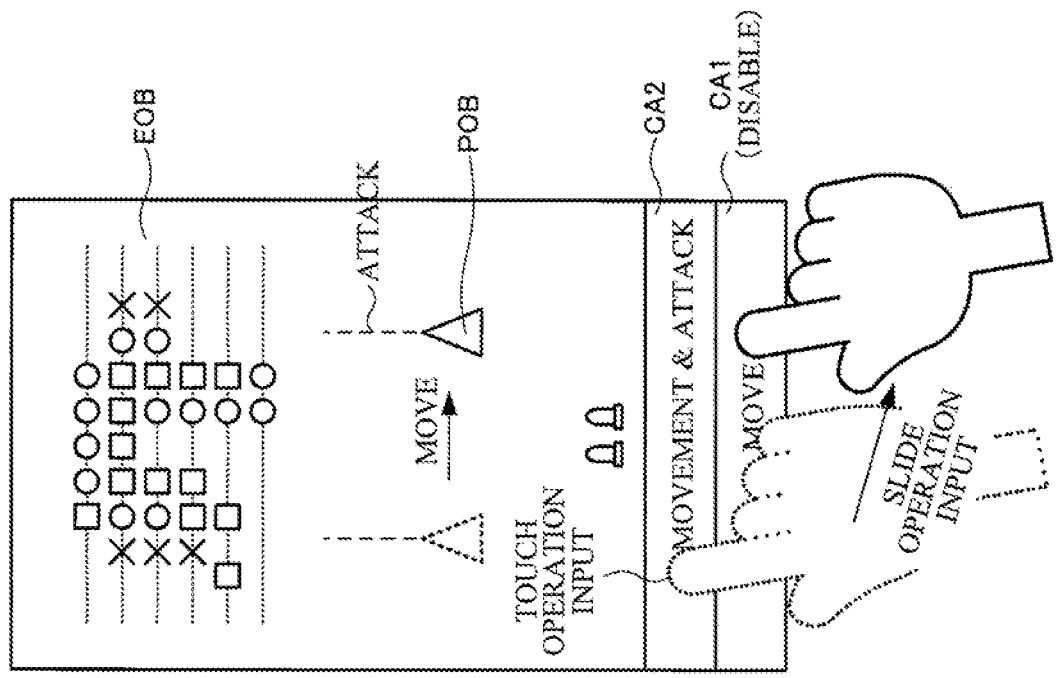
FIGS. 5A and 5B illustrate a player character selection control process based on a slide operation input according to one embodiment of the invention.

FIG. 5A illustrates an example of a shooting game in which the player causes the operation target player character POB to attack a plurality of enemy characters EOB, wherein (1) a "MOVE" input reception area CA1 for moving the operation target player character POB within the game space, and (2) a "MOVE & ATTACK" input reception area CA2 for moving the operation target player character POB within the game space, and causing the operation target player character POB to attack the enemy character are displayed to receive an input instruction.

In this case, when the player has performed a touch operation input on the "MOVE & ATTACK" input reception area CA2 (i.e., first input reception area), and the touch operation input has been detected by the first detection process (i.e., detected by the touch detection processing section 211), the input reception processing section 213 receives a "MOVE & ATTACK" input instruction as the specific command.

The game controller 214 performs the game process that moves the player character POB in the rightward-leftward direction (rightward-leftward direction in FIG. 5A) within the game space relative to the touch panel 12, and causes the player character POB to launch a missile aimed at the enemy character at a given interval based on a slide operation input.

When the player has performed a slide operation input on the touch panel 12, the slide operation input has been detected by the second detection process that follows the first detection process, and the coordinate position based on the slide operation input has been detected by the touch detection processing section 211, the game controller 214 controls the movement of the player character POB in the rightward-leftward direction within the game space relative to the touch panel 12 based on the coordinate position while causing the player character POB to attack the enemy character corresponding to the specific command "MOVE & ATTACK".

Figure 5B:
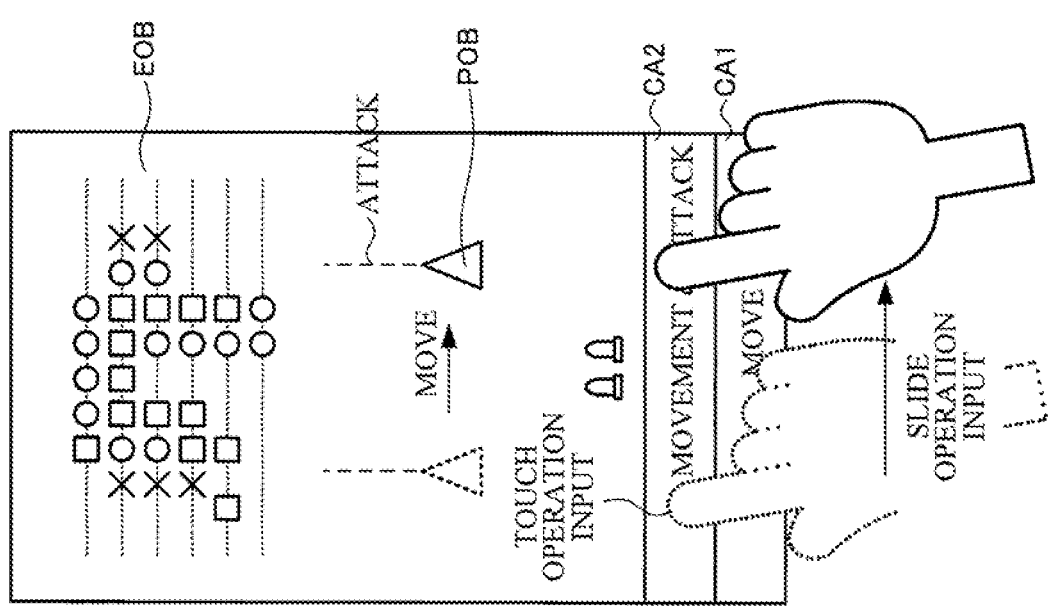

As illustrated in FIG. 5B, when the player has performed a slide operation input on the "MOVE" input reception area CA1 (i.e., second input reception area) (when a slide operation input has been detected by the touch detection processing section 211) in a state in which the specific command "MOVE & ATTACK" is being executed, and the slide operation input is being detected by the second detection process, the input reception processing section 213 disables the input instruction that corresponds to the specific command "MOVE". The game controller 214 continues the game process based on the specific command "MOVE & ATTACK" on the player character POB.

Specifically, when a slide operation input performed on an area other than the "MOVE & ATTACK" input reception area CA2 has been detected by the touch detection processing section 211 in a state in which the specific command "MOVE & ATTACK" is being executed, the game controller 214 continues the game process based on the specific command "MOVE & ATTACK" that causes the player character POB to attack the enemy character, and controls the movement of the player character POB within the game space based on the coordinate position without performing the game process based on the specific command "MOVE".

When the slide operation input detected by the second detection process has been stopped (i.e., when the player has stopped the touch operation input (including the slide operation input) on the touch panel 12), the input reception processing section 213 determines that a given condition has been satisfied, and stops the process that disables a given input instruction corresponding to the second input reception area when the game process based on the input instruction corresponding to the first input reception area is being performed. The game controller 214 stops the game process based on the specific command "MOVE & ATTACK" on the player character POB.

Note that the given condition may be a condition whereby the slide operation input detected by the second detection process has been stopped, a condition whereby the amount of slide operation is equal to or larger than a given value, a condition whereby it has become impossible to continue the game process based on the specific command due to a decrease in attack power, running out of weapons, or the like.

When the player has performed a touch operation input on the "MOVE" input reception area CA1 after the game process has been stopped, and the touch operation input has been detected by the first detection process (i.e., detected by the touch detection processing section 211), the input reception processing section 213 receives (enables) a "MOVE" input instruction as the specific command. The game controller 214 performs the game process based on the specific command "MOVE" on the player character POB.

Specifically, when a touch operation input that implements the specific command "MOVE" has been performed in a state in which a touch operation input is not performed after a slide operation input has been stopped, the game controller 214 performs the game process based on the specific command "MOVE".

(b) Battle Game 1

When implementing the battle game 1 in which the player selects one operation target player character from a plurality of operation target player characters, and causes the selected player character to battle with an enemy character while controlling the movement of the selected player character within the game space, the input reception processing section 213 (1) receives an input instruction regarding the game process (i.e., an input that selects the player character) that corresponds to the input reception area when a touch operation input performed on the input reception area that is linked to one of the player characters has been detected by the first detection process that detects a touch operation input that has been performed in a state in which no touch operation input is performed on the touch panel 12, and (2) disables a given input instruction that corresponds to the input reception area when a slide operation input performed on the input reception area for selecting another player character has been detected in a state in which a slide operation input is being detected by the second detection process that detects a slide operation input that has been performed to directly follow the touch operation input detected by the first detection process.

Specifically, the first input reception area and the second input reception area correspond to the player characters that can be operated by the player, and the input reception processing section 213 enables or disables the input instruction that selects the player character.

When a slide operation input is being detected by the second detection process, the input reception processing section 213 disables the input instruction that corresponds to the character that has an attribute that is identical to that of the operation target character selected based on the input reception area, and enables the input instruction that corresponds to the character that has an attribute that differs from that of the operation target character selected based on the input reception area.

The game controller 214 controls the movement of the operation target player character within the game space based on the slide operation input that is being performed to directly follow the touch operation input that selects the operation target player character and detected by the second detection process.

Specifically, when the game is a battle game that utilizes a plurality of player characters, and the input instruction that corresponds to the input reception area instructs to select one operation target player character from a plurality of operation target player characters, the input reception processing section 213 enables the input instruction that selects the player character based on the touch operation input detected by the first detection process.

When the player has performed a slide operation input on the input reception area for selecting the player character (e.g., enemy character) that has an attribute that differs from that of the operation target character in a state in which the movement of the operation target player character is being controlled based on the slide operation input detected by the second detection process, the game controller 214 performs a specific game process based on the operation target player character and the character selected by the slide operation input.

When a touch operation has been performed on the input reception area that is linked to the player character that has an attribute that identical to that of the operation target character in a state in which the movement of the operation target player character is being controlled based on the slide operation input detected by the second detection process, the input reception processing section 213 disables the input for selecting the player character (i.e., an input for switching the player character) based on the slide operation input that has been performed on the input reception area.

In this case, the game controller 214 continues the game process that controls the movement of the player character selected by the touch operation input detected by the first detection process.

FIG. 6A illustrates an example of the battle game 1 in which the player selects one operation target player character POB from a plurality of operation target player characters, and causes the selected player character POB to battle with the enemy character EOB while controlling the movement of the selected player character POB within the game space, wherein (1) a plurality of input reception areas CA3 that respectively correspond to the plurality of operation target player characters POB, and (2) an input reception area CA4 that corresponds to the enemy character EOB are displayed to receive an input instruction.

In this case, when the player has performed a touch operation input on the input reception area CA3 that corresponds to a player character POB2 (i.e., first input reception area), and the touch operation input has been detected by the first detection process (i.e., detected by the touch detection processing section 211), the input reception processing section 213 receives an input instruction that selects the player character POB2 to be the operation target.

The game controller 214 performs the game process that controls the movement of the player character POB2 within the game space based on the slide operation input.

When the player has performed a slide operation input on the touch panel 12, the slide operation input has been detected by the second detection process that follows the first detection process, and the coordinate position based on the slide operation input has been detected by the touch detection processing section 211, the game controller 214 controls the movement of the player character POB2 within the game space based on the coordinate position.

As illustrated in FIG. 6B, when the player has performed a slide operation input on the input reception area CA3 that corresponds to another player character (i.e., second input reception area) (when a slide operation input has been detected by the touch detection processing section 211) in a state in which the movement of the player character POB2 within the game space is being controlled, the input reception processing section 213 disables the input instruction that selects the player character. The game controller 214 continues the game process that controls the movement of the player character POB2.

Specifically, when one of the player characters has been selected, and a slide operation input performed on an area other than the input reception area CA3 that corresponds to the selected player character has been detected by the touch detection processing section 211, the game controller 214 continues the game process that controls the movement of the player character POB2 within the game space based on the coordinate position detected based on the slide operation input.

As illustrated in FIG. 6A, when the player has performed a slide operation input on the input reception area CA4 that corresponds to the enemy character (when a slide operation input has been detected by the touch detection processing section 211) in a state in which the movement of the player character POB2 within the game space is being controlled, the input reception processing section 213 performs a specific game process (battle control process) based on the operation target player character POB and the enemy character EOB selected by the slide operation input.

When the slide operation input detected by the second detection process has been stopped (i.e., when the player has stopped the touch operation input (including the slide operation input) on the touch panel 12), the input reception processing section 213 determines that a given condition has been satisfied, and stops the process that disables a given input instruction corresponding to the second input reception area when the game process based on the input instruction corresponding to the first input reception area is being performed. The game controller 214 stops the game process on the player character POB2.

Note that the given condition may be a condition whereby the slide operation input detected by the second detection process has been stopped, a condition whereby the amount of slide operation is equal to or larger than a given value, a condition whereby it has become impossible to continue the game process based on the specific command due to a decrease in attack power, running out of weapons, or the like.

When the player has performed a touch operation input on the input reception area CA3 that corresponds to a player character POB3 after the game process has been stopped, and the touch operation input has been detected by the first detection process (i.e., detected by the touch detection processing section 211), the input reception processing section 213 receives an input instruction that selects the player character POB3 to be the operation target, and performs the game process that controls the movement of the player character POB2 within the game space based on the slide operation input.

(c) Battle Game 2

When implementing the battle game 2 in which the player causes one player character selected from a plurality of operation target player characters to implement one specific command selected from a plurality of specific commands to battle with an enemy character, the input reception processing section 213 (1) receives an input instruction regarding the game process (i.e., an input that selects the specific command) that corresponds to the input reception area when a touch operation input performed on the input reception area that is linked to the specific attack command has been detected by the first detection process that detects a touch operation input that has been performed in a state in which no touch operation input is performed on the touch panel 12, and (2) disables a given input instruction that corresponds to the input reception area when a slide operation input performed on the input reception area for inputting the command has been detected in a state in which a slide operation input is being performed to directly follow the touch operation input detected by the first detection process and detected by the second detection process.

When a slide operation input performed on the input reception area that is linked to one of the player characters has been detected in a state in which a slide operation input is being performed to directly follow the touch operation input that selects the operation target player character and detected by the second detection process, the game controller 214 receives the input instruction regarding the game process (i.e., an input that selects the player character) that corresponds to the input reception area from which the slide operation input has been detected.

The game controller 214 performs the game process that causes the selected player character to implement the selected specific command to battle with the enemy character.

Specifically, when the game is a battle game that utilizes a plurality of specific commands and a plurality of player characters, and the input instruction that corresponds to the input reception area includes an instruction that instructs to implement a specific command that performs a specific control process on the player character that is operated by the player, and an instruction that instructs to select one player character from a plurality of operation target player characters, the input reception processing section 213 enables the command input based on the touch operation input detected by the first detection process.

The input reception processing section 213 disables the command input on the input reception area based on the slide operation input that has been performed to directly follow the touch operation input, and enables the input based on the slide operation input that has been performed on the input reception area and selects the player character.

The game controller 214 performs a specific game process that causes one player character selected from a plurality of operation target player characters to implement one specific command selected from a plurality of specific commands to battle with the enemy character.

In this case, the first input reception area and the second input reception area correspond to the specific commands and the player characters that can be operated by the player, and the input reception processing section 213 enables or disables the input instruction that selects the specific command and the input instruction that selects the player character.

Figure 7A:
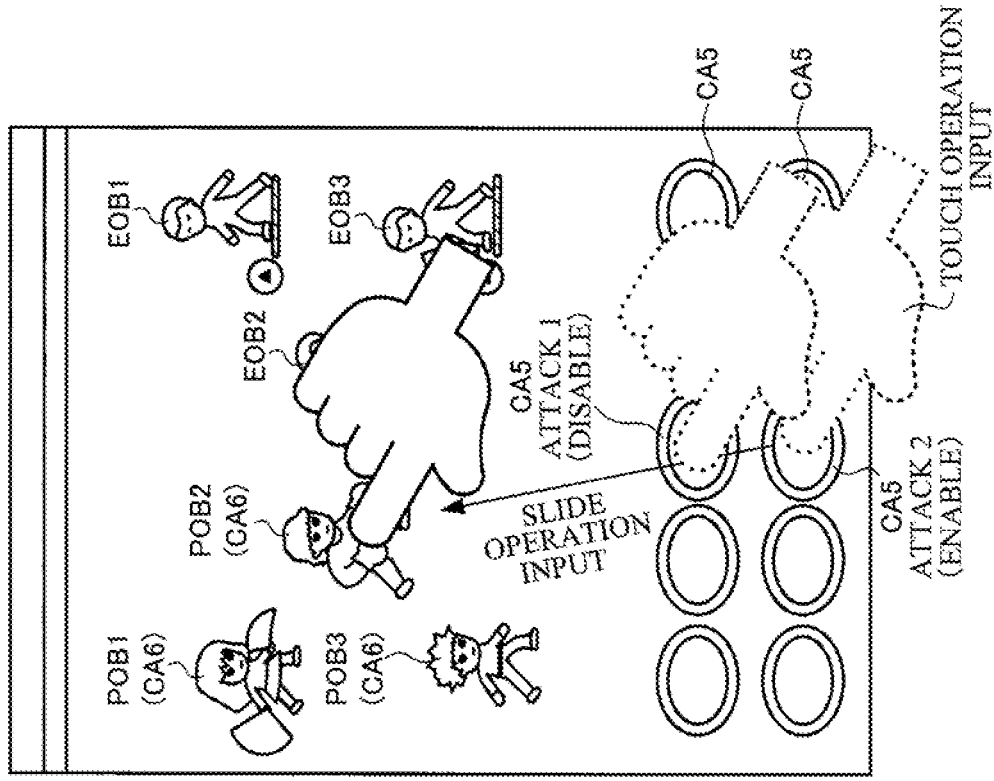
FIGS. 7A and 7B illustrate a player character selection control process based on a slide operation input according to one embodiment of the invention.

FIG. 7A illustrates an example of the battle game 2 in which the player causes one player character POB selected from a plurality of operation target player characters to implement a specific command selected from a plurality of specific commands to battle with the enemy character EOB, wherein (1) a plurality of input reception areas CA5 for selecting the specific command that is implemented by the operation target player character POB, and (2) a plurality of input reception areas CA6 that respectively correspond to a plurality of operation target player characters POB are displayed to receive an input instruction.

In this case, when the player has performed a touch operation input on the "ATTACK 1" input reception area CA5 (i.e., first input reception area), and the touch operation input has been detected by the first detection process (i.e., detected by the touch detection processing section 211), the input reception processing section 213 receives an "ATTACK 1" input instruction as the specific command.

When the player has performed a slide operation input on the input reception area CA6 that corresponds to a player character POB2, and the slide operation input has been detected by the second detection process (i.e., detected by the touch detection processing section 211), the input reception processing section 213 receives an input instruction that selects the player character POB2 to be the operation target.

Figure 7B:
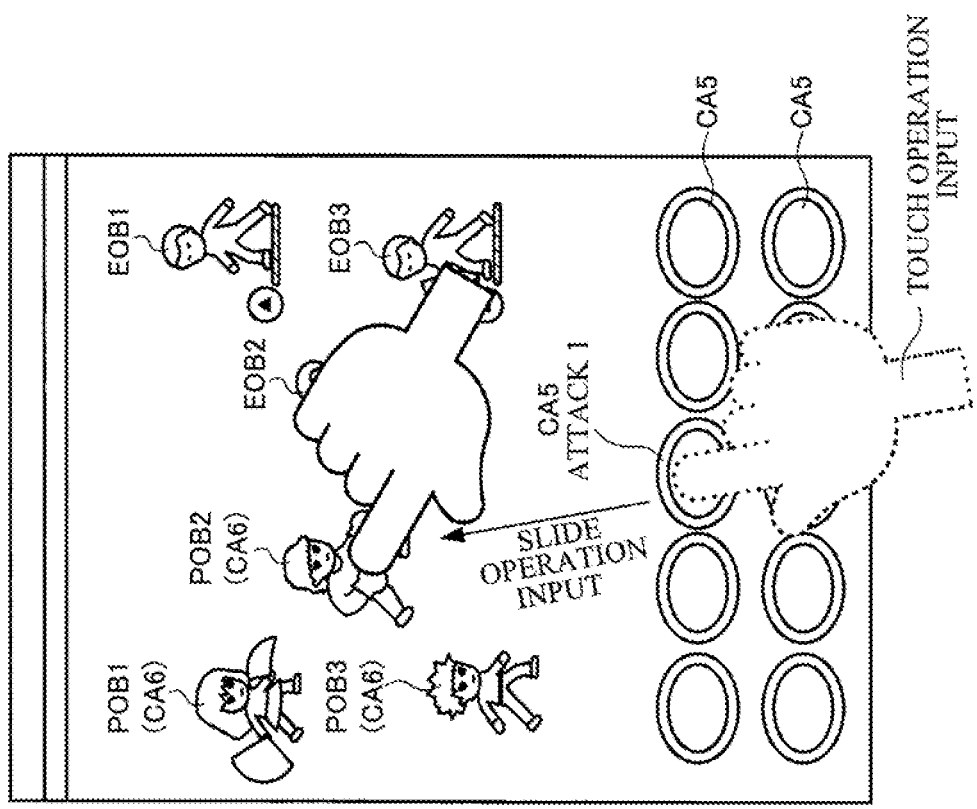

As illustrated in FIG. 7B, when the player has performed a slide operation input on the input reception area CA5 that corresponds to another specific command ("ATTACK 1") (i.e., second input reception area) (when a slide operation input has been detected by the touch detection processing section 211) in a state in which the "ATTACK 2" input instruction is being received as the specific command, and a slide operation input is being performed to directly follow the touch operation input when the "ATTACK 2" input instruction was received as the specific command, the input reception processing section 213 disables the input instruction that selects the other specific command.

When the player has performed a slide operation input on the input reception area CA5 that corresponds to the player character (when a slide operation input has been detected by the touch detection processing section 211) in a state in which a slide operation input is being detected by the second detection process, the game controller 214 performs a specific game process that causes the player character POB2 selected by the slide operation input to attack ("ATTACK 2") the enemy character.

4.3. Modifications

Modifications of the embodiments of the invention are described below.

(a) Termination of Game Process

Although an example in which the game process that uses the command based on the touch operation input or the game process based on the selected operation target player character is terminated (stopped) upon completion of the slide operation input has been described above, the game process may be terminated when a given time has elapsed after a touch operation input has been performed during the slide operation input, or when a given amount of slide operation input has been performed.

(b) Notification Control Process

The display controller 212 may display a display (notification) for determining the input instruction received by the input reception processing section 213.

Specifically, the display controller 212 may display a display for determining the specific command received by the input reception processing section 213 or the operation target player character selected based on the touch operation input detected by the first detection process.

For example, when the game is a shooting game, the display controller 212 displays the input reception area CA that corresponds to the specific command received by the input reception processing section 213 in a way differing from other specific commands (e.g., displays the input reception area CA so as to blink, or changes the display color of the input reception area CA).

When the game is a battle game, the display controller 212 displays the selected player character or the selected specific command in a way differing from other player characters or other specific commands (e.g., displays the selected player character or the selected specific command so as to blink, or displays the selected player character or the selected specific command using a marker, or changes the display color of the selected player character or the selected specific command).

The sound processing section 230 according to one embodiment of the invention may output a sound that is set corresponding to each specific command or each player character, or the terminal device 20 may be vibrated in a vibration pattern that is set corresponding to each specific command or each player character by vibrating a vibrator (not illustrated in the drawings) provided to the terminal device 20.

(c) Disabling Process that Disables Part of Composite Specific Command

In the embodiments of the invention, when a slide operation input on the input reception area has been detected when a slide operation input that is performed to directly follow the touch operation input is being detected by the second detection process, the input instruction (specific command) that corresponds to the input reception area is disabled. When a plurality of specific commands are linked to the input reception area, part of the plurality of specific commands (hereinafter referred to as "composite specific command") may be enabled, and part of the composite specific command may be disabled.

For example, commands "MISSILE ATTACK AND LOW MOVING SPEED" and "LASER ATTACK AND HIGH MOVING SPEED" are set as the composite specific commands. In this case, when the player has performed a slide operation input on the "LASER ATTACK AND HIGH MOVING SPEED" input reception area (when a slide operation input has been detected by the touch detection processing section 211) in a state in which the composite specific command "LASER ATTACK AND HIGH MOVING SPEED" is being executed based on the touch operation input, and the slide operation input is being detected by the second detection process, the input reception processing section 213 enables the specific command "HIGH MOVING SPEED" selected by the slide operation input, and disables the specific command "LASER ATTACK".

The game controller 214 changes the composite specific command "MISSILE ATTACK AND LOW MOVING SPEED" that correspond to the selected player character to the composite specific command "MISSILE ATTACK AND HIGH MOVING SPEED", and performs the game process based on the composite specific command "MISSILE ATTACK AND HIGH MOVING SPEED".

Specifically, the game controller 214 changes the game process based on the specific command "LOW MOVING SPEED" to the game process based on the specific command "HIGH MOVING SPEED" while continuing the game process based on the specific command "MISSILE ATTACK".

Note that the specific command included in the composite specific command that is enabled or disabled corresponding to the slide operation input is changed corresponding to the attribute of the player character selected by the touch operation input or the like, the parameter (e.g., hit points) of the player character, or an item that is possessed by the player character and used in the game.

Specifically, the specific command that implements attack is enabled when the attack power of the selected player character is high (e.g., when the selected player character has an attack parameter or a game level equal to or higher than a given level), and the specific command that implements movement is enabled when the moving capability of the selected player character is high (e.g., when the selected player character possesses an item that implements quick movement).

When a slide operation input has been performed on the input reception area that corresponds to the composite specific command, part of the composite specific command may be enabled or disabled by charging the player.

(d) Process that Enhances Power of Player Character

When a slide operation input performed on the input reception area has been detected in a state in which a slide operation input that is performed to directly follow the touch operation input when the input instruction regarding the game process was received is being detected by the second detection process, and a given condition with regard to the slide operation input has been satisfied, the input reception processing section 213 may acquire the power relating to the game that is linked to the input reception area.

The game controller 214 may perform the game process based on the input instruction received by the input reception processing section 213, the slide operation input performed to directly follow the touch operation input performed when the input instruction was received, and the acquired power.

Specifically, when a slide operation input performed on the input reception area that corresponds to the specific command (laser attack) that is identical to the selected specific command (laser attack) has been detected in a state in which a slide operation input is being detected by the second detection process, the game controller 214 may perform the game process based on the specific command (laser attack) so that the power of the specific command (laser attack) is enhanced (e.g., doubled).

Note that the given condition may be a condition whereby the slide operation time is equal to or longer than a given time, a condition whereby the amount of slide operation is equal to or larger than a given value, a condition whereby the attribute of the specific command is a predetermined attribute, or the like.

(e) Disabling Process Based on Attribute of Player Character

When the game is the battle game 2 in which the selected player character battles with the enemy character, the input reception processing section 213 disables the switching from the selected player character to another player character that has an attribute that is identical to that of the selected player character, and enables the input instruction that corresponds to the enemy character that has an attribute that differs from that of the selected player character. Note that the input instruction may be enabled or disabled corresponding to the attribute of the player character.

For example, when a slide operation input on the input reception area for selecting the player character that has an attribute (e.g., water or fire) that is identical to that of the selected player character has been detected during the slide operation input detected by the second detection process, the input reception processing section 213 may enable the input instruction that selects the player character for which the slide operation input has been detected, and disable the input instruction that selects the player character that has an attribute that differs from that of the selected player character.

In this case, the game controller 214 may acquire the hit points, the life energy, the item (including a weapon used for attack and defense, and expendables such as bullets), the in-game money, or the game level of the player character for which the input instruction has been enabled, and perform the game process based on the acquired hit points or the like.

(f) Disabling Process Based on Variable Parameter

The game calculation section 215 manages the variable parameter that changes corresponding to the slide operation input detected by the second detection process, and notifies the input reception processing section 213 or the game controller 214 when the variable parameter has reached a given value (e.g., upper limit).

When the touch detection processing section 211 has performed the third detection process that detects a state in which a touch operation input on the screen is not performed during the slide operation input detected by the second detection process, the input reception processing section 213 disables the input instruction that corresponds to the second input reception area as the given input instruction until the variable parameter reaches the given value, and enables the input instruction that corresponds to the second input reception area as the given input instruction when the variable parameter has reached the given value.

When the third detection process has detected a state in which a touch operation input on the touch panel 12 is not performed when the variable parameter has reached a given value (e.g., upper limit), the game controller 214 performs the game process based on the input instruction (e.g., the input instruction that corresponds to the second input reception area) received by the input reception processing section 213.

When a slide operation input on the second input reception area has been detected by the second detection process when the variable parameter has reached a given value (e.g., upper limit), the input reception processing section 213 may receive the input instruction that corresponds to the second input reception area. In this case, the game controller 214 performs the game process based on the received input instruction that corresponds to the second input reception area.

5. Operation

The operation performed by the terminal device 20 according to one embodiment of the invention when implementing the disabling process (that is performed when a slide operation input is performed on the input reception area) is described below with reference to FIG. 8. Note that FIG. 8 is a flowchart illustrating the operation performed by the terminal device 20 according to one embodiment of the invention when implementing the disabling process (that is performed when a slide operation input is performed on the input reception area).

Figure 8:
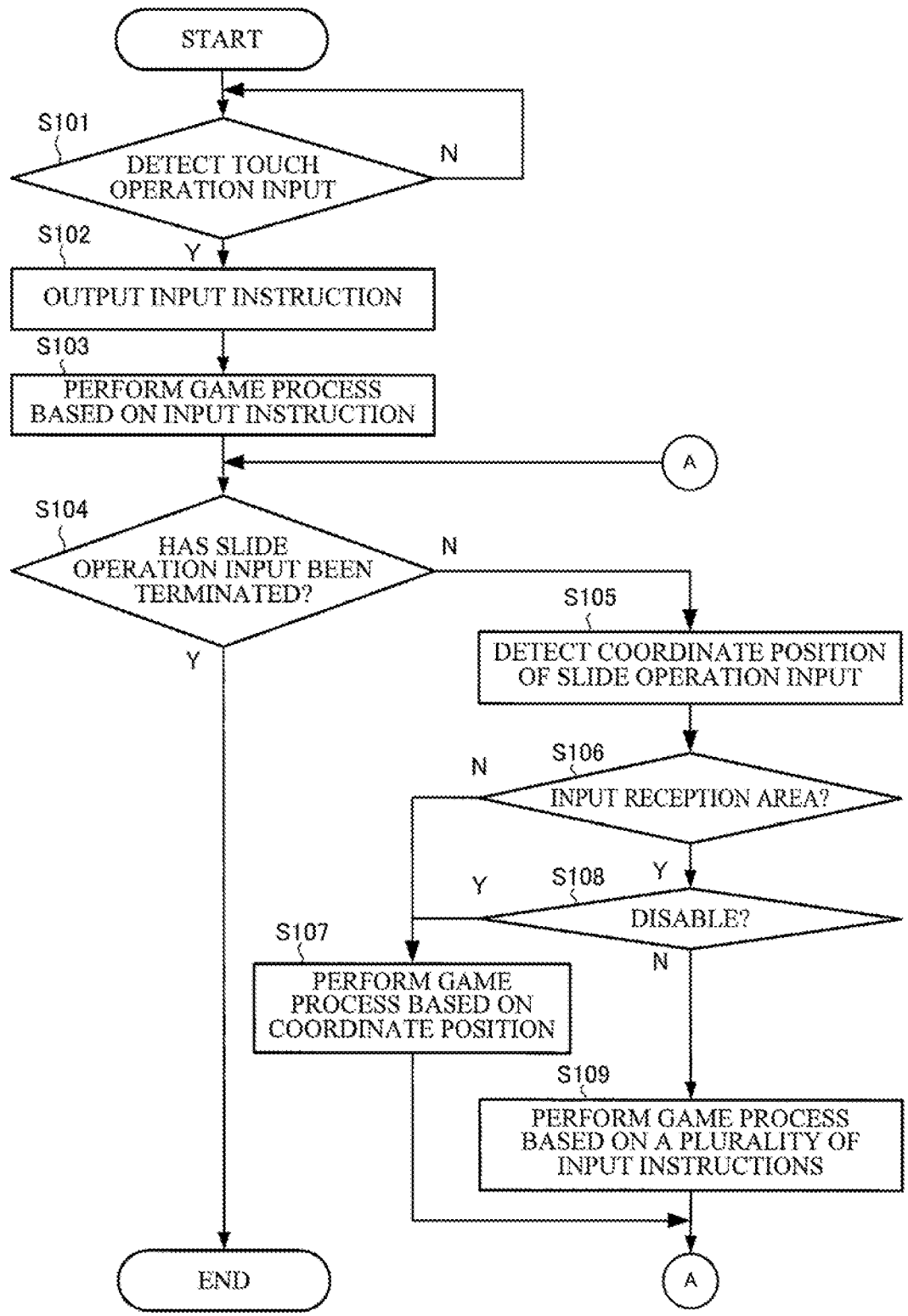
FIG. 8 is a flowchart illustrating an operation performed by a terminal device according to one embodiment of the invention when implementing a disabling process that is performed when a slide operation input is performed on an input reception area.

The operation illustrated in FIG. 8 is performed when implementing the disabling process (that is performed when a slide operation input is performed on the input reception area) during the game, and is performed by the terminal device 20 in principle. Note that part of the disabling process may be performed by the terminal device 20 in cooperation with the server 10.

When the touch detection processing section 211 has detected that a touch operation input has been performed on the input reception area (command display area or operation target character display area) displayed on the touch panel 12 in a state in which a touch operation input on the touch panel 12 is not performed (step S101), the input reception processing section 213 receives the input instruction linked to the input display area, and outputs the input instruction to the game controller 214 (step S102).

The game controller 214 performs a predetermined game process based on the input instruction input from the input reception processing section 213 (step S103).

Specifically, the game controller 214 (1) performs a command control process that causes the operation target player character to attack or defend based on the specific command that corresponds to the input instruction when the game is a shooting game, (2) selects the operation target player character that corresponds to the input instruction when the game is a battle game (battle game 1) based on a movement operation in which the movement of the operation target player character within the game space is controlled, and (3) selects the command that corresponds to the input instruction when the game is a battle game (battle game 2) based on a command in which the operation target player character and the command that is implemented by the player character are selected.

The touch detection processing section 211 determines whether or not a slide operation input has been terminated (step S104). When the touch detection processing section 211 has determined that a slide operation input has not been terminated, the touch detection processing section 211 performs a step S105. When the touch detection processing section 211 has determined that a slide operation input has been terminated, the operation is terminated.

When the touch detection processing section 211 has determined that a slide operation input has not been terminated, the touch detection processing section 211 detects the coordinate position (on the touch panel 12) of the slide operation input that has been performed to directly follow the touch operation (step S105).

The input reception processing section 213 determines whether or not the detected coordinate position on the touch panel 12 corresponds to the input reception area (command display area or character display area) displayed on the touch panel 12 (step S106).

Specifically, the input reception processing section 213 (1) determines whether or not the detected coordinate position corresponds to the input reception area that corresponds to another command when the game is a shooting game, (2) determines whether or not the detected coordinate position corresponds to the display area of another operation target player character or the display area of the enemy character when the game is a battle game (battle game 1) based on a movement operation in which the movement of the operation target player character within the game space is controlled, and (3) determines whether or not the detected coordinate position corresponds to the display area of the operation target player character or the display area of another command when the game is a battle game (battle game 2) based on a command in which the operation target player character and the command that is implemented by the player character are selected.

When the input reception processing section 213 has determined that the detected coordinate position on the touch panel 12 does not correspond to the input reception area displayed on the touch panel 12, the game controller 214 performs a predetermined game process such as the movement control process that controls the movement of the operation target character within the game space based on the slide operation at the coordinate position (step S107), and the step S104 is performed again.

Specifically, the game controller 214 (1) performs the movement control process that moves the operation target character to the coordinate position within the game space when the game is a shooting game, (2) performs the movement control process that controls the movement of the operation target character within the game space when the game is a battle game (battle game 1) based on a movement operation in which the movement of the operation target player character within the game space is controlled, and (3) performs a process that waits for an input instruction regarding the operation target player character when the game is a battle game (battle game 2) based on a command in which the operation target player character and the command that is implemented by the player character are selected.

When the input reception processing section 213 has determined that the detected coordinate position on the touch panel 12 corresponds to the input reception area displayed on the touch panel 12, the input reception processing section 213 determines whether or not the input instruction that corresponds to the input reception area should be disabled (step S108).

Specifically, the input reception processing section 213 (1) determines whether or not the detected coordinate position corresponds to the display area of the enemy character when the game is a battle game (battle game 1) based on a movement operation in which the movement of the operation target player character within the game space is controlled, and (2) determines whether or not the detected coordinate position corresponds to the display area of the operation target player character when the game is a battle game (battle game 2) based on a command in which the operation target player character and the command that is implemented by the player character are selected.

When the input reception processing section 213 has determined that the input instruction that corresponds to the input reception area should be disabled, the step S207 is performed. Note that the input reception processing section 213 necessarily determines that the input instruction that corresponds to the input reception area should be disabled when the game is a shooting game, for example.

When the input reception processing section 213 has determined that the input instruction that corresponds to the input reception area should not be disabled, the input reception processing section 213 outputs the input instruction that corresponds to the input reception area to the game controller 214, the game controller 214 performs a predetermined game process based on the input instruction that corresponds to the input reception area, and the input instruction output in the step S102 (step S109), and the step S104 is performed again.

In the step S109, the game controller 214 (1) performs the game process that causes the operation target player character to attack the enemy character when the game is a battle game (battle game 1) based on a movement operation in which the movement of the operation target player character within the game space is controlled, and (2) performs the game process that causes the operation target player character to attack based on the specific command when the game is a battle game (battle game 2) based on a command in which the operation target player character and the command that is implemented by the player character are selected.

When the game is a shooting game, the steps S106, S108, and S109 may be omitted, the input instruction that corresponds to another command may be disabled, and the game process (movement control process on the operation target player character) based on the detected coordinate position of the slide operation may be performed until the termination of the slide operation input is detected in the step S104 (steps S105 and S107).

When a slide operation input on the input reception area has been detected during the slide operation input that has been performed to directly follow the touch operation input, and part of the input instruction that corresponds to the input reception area is disabled, the game process based on the enabled input instruction is performed in the step S109.

6. Other

The invention is not limited to the above embodiments. Various modifications and variations may be made of the above embodiments. Any term cited with a different term having a broader meaning or the same meaning at least once in the specification and the drawings can be replaced by the different term in any place in the specification and the drawings.

Although the above embodiments have been described taking an operation input performed during an RPG as an example, the above embodiments can similarly be applied to other games such as a battle game and a simulation game.

A single server 10 may provide each game to the terminal device 20, or a server system in which a plurality of servers 10 operate in cooperation may provide each game to the terminal device 20.

Although the above embodiments have been described taking an example in which the game provided by the server 10 is executed by the terminal device 20, each function of the processing section 200 of the terminal device 20 (except for the touch detection processing section 211) and the game program may be implemented and executed by the server 10, and the terminal device 20 may implement the game through an operation input and streaming image display.

Although the above embodiments have been described taking an example in which the terminal device according to the invention is applied to a game device, the terminal device according to the invention may be applied to an arbitrary terminal device that allows the user to perform an operation input using a touch panel (e.g., smartphone, tablet-type information terminal device, personal computer, monitor, or TV).

The invention includes various other configurations substantially the same as the configurations described in connection with the above embodiments (e.g., a configuration having the same function, method, and results, or a configuration having the same objective and effects). The invention also includes a configuration in which an unsubstantial element described in connection with the above embodiments is replaced with another element. The invention also includes a configuration having the same effects as those of the configurations described in connection with the above embodiments, or a configuration capable of achieving the same objective as that of the configurations described in connection with the above embodiments. The invention further includes a configuration in which a known technique is added to the configurations described in connection with the above embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A terminal device comprising:
a processor programmed to:
cause a touch panel display screen to display a first input reception area and a second input reception area that differs from the first input reception area, the first input reception area corresponding to a first input instruction performed by a player in connection with a touch panel display game, and the second input reception area corresponding to a second input instruction performed by the player in connection the touch panel display game, the first input instruction being different from the second input instruction;
in a state in which no touch operation input is being performed on the touch panel display screen, perform a first detection process that detects a touch operation input that has been performed on the touch panel display screen in one of the first and second input reception areas; and
directly following and in response to detecting the touch operation input in the one of the first and second input reception areas by the first detection process:
perform a second detection process that detects a slide operation performed on the touch panel display directly following the detected touch operation by the first detection process, the slide operation starting in one of the first and second input reception areas and extending into the other one of the input receptions areas; and
in response to detecting the slide operation performed on the touch panel display screen by the second detection process:
perform the input instruction related to the game that corresponds to the one of the first and second input reception areas in which the slide operation input is performed, and
disable the other one of the first and second input reception areas, which is the one of the first and second input reception areas in which the touch operation input is not performed, to not detect touch operations and slide operations, the other one of the first and second input reception areas being different from the one of the first and second input reception areas,
wherein the slide operation starts in the one of the first and second input reception areas and extends into the other one of the input receptions areas, where the input operation of the other one of the input reception areas is disabled and the input operation of the one of the first and second input reception areas continues to be executed in the other one of the input receptions areas as the slide operation extends into the other one of the input receptions areas.

2. The terminal device as defined in claim 1, wherein the processor is further programmed to:
determine whether the first input reception area and the second input reception area correspond to a same type of input instruction, and
disable the input instruction that corresponds to the second input reception area upon determining that the first input reception area and the second input reception correspond to the same type of input instruction.

3. The terminal device as defined in claim 1, wherein:
the input instruction related to the game is an instruction that instructs to implement a specific command that performs a first specific control process on a character that is operated by the player, and
the processor is further programmed to continue to perform the first specific control process on the character performed by the specific command based on the slide operation input that has been performed to directly follow the touch operation input performed when the specific command was received and detected by the second detection process.

4. The terminal device as defined in claim 3, wherein processor is further programmed to perform a second specific game process that controls movement of the character that is operated by the player within a game space based on the slide operation input that has been performed to directly follow the touch operation input performed when the specific command was received and detected by the second detection process.

5. The terminal device as defined in claim 1, wherein the first input reception area and the second input reception area correspond to characters operated by the player.

6. The terminal device as defined in claim 5, wherein, when the slide operation input performed to directly follow the touch operation input performed when the input instruction that selects the character that is operated by the player was received is detected by the second detection process, the processor is programmed to:
disable the input instruction that corresponds to a character that has an attribute that is identical to an attribute of the character that is operated by the player that has been selected based on the second input reception area, and
enable the input instruction that corresponds to a character that has an attribute that differs from the attribute of the character that is operated by the player that has been selected based on the second input reception area.

7. The terminal device as defined in claim 1, wherein the processor is further programmed to:
acquire a power relating to a game that is linked to the second input reception area when the slide operation input on the second input reception area has been detected during the slide operation input that is performed to directly follow the touch operation input performed when the input instruction regarding the game process was received and is detected by the second detection process, and
when a given condition with regard to the slide operation input has been satisfied, perform a game process based on the slide operation input performed to directly follow the touch operation input performed when the input instruction was received, and the acquired power.

8. The terminal device as defined in claim 1, wherein the processor is further configured to issue a notification for determining the first input instruction or the second input instruction.

9. The terminal device as defined in claim 1, wherein the processor is further programmed to stop the disablement of the other one of the first input reception area and the second input reception area, in response to a predetermined condition being satisfied during the game process based on the input instruction that corresponds to the one of the first input reception area and the second input reception area.

10. The terminal device as defined in claim 1, wherein the processor is further programmed to:
    manage a variable parameter that changes corresponding to the slide operation input detected by the second detection process,
    perform a third detection process that detects a state in which the touch operation input on the screen is not performed during the slide operation input detected by the second detection process,
    disable the input instruction that corresponds to the second input reception area as the given input instruction until the variable parameter reaches a given value; and
    perform a game process based on the received input instruction when the third detection process has detected a state in which the touch operation input on the screen is not performed when the variable parameter has reached the given value.

11. The terminal device as defined in claim 10, wherein, when a slide operation input on the second input reception area has been detected by the second detection process in response to the variable parameter reaching the given value, the processor is programmed to:
    receive the input instruction that corresponds to the second input reception area, and
    perform the game process based on the received input instruction that corresponds to the second input reception area.

12. The terminal device as defined in claim 1, further comprising the touch panel display screen.

13. A non-transitory computer readable medium comprising computer-executable instructions that, when executed by a processor, cause the processor to:
    cause a touch panel display screen to display a first input reception area and a second input reception area that differs from the first input reception area, the first input reception area corresponding to a first input instruction performed by a player in connection with a touch panel display game, and the second input reception area corresponding to a second input instruction performed by the player in connection the touch panel display game, the first input instruction being different from the second input instruction;
    in a state in which no touch operation input is being performed on the touch panel display screen, perform a first detection process that detects a touch operation input that has been performed on the touch panel display screen in one of the first and second input reception areas; and
    directly following and in response to detecting the touch operation input in the one of the first and second input reception areas by the first detection process:
        perform a second detection process that detects a slide operation performed on the touch panel display directly following the detected touch operation by the first detection process, the slide operation starting in one of the first and second input reception areas and extending into the other one of the input receptions areas; and
        in response to detecting the slide operation performed on the touch panel display screen by the second detection process:
            perform the input instruction related to the game that corresponds to the one of the first and second input reception areas in which the slide operation input is performed, and
            disable the other one of the first and second input reception areas, which is the one of the first and second input reception areas in which the touch operation input is not performed, to not detect touch operations and slide operations, the other one of the first and second input reception areas being different from the one of the first and second input reception areas,
    wherein the slide operation starts in the one of the first and second input reception areas and extends into the other one of the input receptions areas, where the input operation of the other one of the input reception areas is disabled and the input operation of the one of the first and second input reception areas continues to be executed in the other one of the input receptions areas as the slide operation extends into the other one of the input receptions areas.

14. A terminal device comprising:
    a processor programmed to:
    cause a touch panel display screen to display a first input reception area and a second input reception area that differs from the first input reception area, the first input reception area corresponding to a first input instruction performed by an user, and the second input reception area corresponding to a second input instruction performed by the user, the first input instruction being different from the second input instruction;
    in a state in which no touch operation input is being performed on the touch panel display screen, perform a first detection process that detects a touch operation input that has been performed on the touch panel display screen in one of the first and second input reception areas; and
    directly following and in response to detecting the touch operation input in the one of the first and second input reception areas by the first detection process:
        perform a second detection process that detects a slide operation performed on the touch panel display directly following the detected touch operation by the first detection process, the slide operation starting in one of the first and second input reception areas and extending into the other one of the input receptions areas; and
        in response to detecting the slide operation performed on the touch panel display screen by the second detection process:
            perform the input instruction that corresponds to the one of the first and second input reception areas in which the slide operation input is performed, and
            disable the other one of the first and second input reception areas, which is the one of the first and second input reception areas in which the touch operation input is not performed, to not detect touch operations and slide operations, the other one of the first and second input reception areas being different from the one of the first and second input reception areas, wherein the slide operation starts in the one of the first and second input reception areas and extends into the other one of the input receptions areas, where the input operation of the other one of the input reception areas is disabled and the input operation of the one of the first and second input reception areas continues to be executed in the other one of the input receptions areas as the slide operation extends into the other one of the input receptions areas.

* * * * *